(12) United States Patent
Liu et al.

(10) Patent No.: US 9,160,428 B2
(45) Date of Patent: *Oct. 13, 2015

(54) TECHNIQUES FOR FLEXIBLE AND EFFICIENT BEAMFORMING

(71) Applicant: MARVELL WORLD TRADE LTD., St. Michael (BB)

(72) Inventors: Yong Liu, Santa Clara, CA (US); Hongyuan Zhang, Fremont, CA (US); Hui-Ling Lou, Sunnyvale, CA (US); Raja Banerjea, Sunnyvale, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 13/964,953

(22) Filed: Aug. 12, 2013

(65) Prior Publication Data

US 2013/0329718 A1 Dec. 12, 2013

Related U.S. Application Data

(63) Continuation of application No. 12/709,115, filed on Feb. 19, 2010, now Pat. No. 8,509,130.

(60) Provisional application No. 61/154,985, filed on Feb. 24, 2009.

(51) Int. Cl.
*H04B 7/04* (2006.01)
*H04B 7/06* (2006.01)
*H04B 7/08* (2006.01)

(52) U.S. Cl.
CPC ............ *H04B 7/0408* (2013.01); *H04B 7/0695* (2013.01); *H04B 7/088* (2013.01)

(58) Field of Classification Search
None
See application file for complete search history.

(56) References Cited

U.S. PATENT DOCUMENTS 6,233,466 B1  5/2001  Wong et al.
7,599,332 B2  10/2009  Zelst et al.

(Continued)

FOREIGN PATENT DOCUMENTS

EP   1659813 A1   5/2006
EP   1912346 A1   4/2008
WO   WO-2006/031495 A2   3/2006

OTHER PUBLICATIONS

IEEE Std 802.15.3c/D07 (Amendment to IEEE Std 802.15.3-2003) "Draft Amendment to IEEE Standard for Information technology—Telecommunications and information exchange between systems—Local and metropolitan area networks—Specific requirements—Part 15.3: Wireless Medium Access Control (MAC) and Physical Layer (PHY) Specifications for High Rate Wireless Personal Area Networks (WPANs): Amendment 2: Millimeter-wave based Alternative Physical Layer Extension," *The Institute of Electrical and Electronics Engineers, Inc.*(2009).

(Continued)

*Primary Examiner* — Jason Mattis
*Assistant Examiner* — Teisha D Hall

(57) ABSTRACT

Training data for a first training session is generated to include a first data unit, the first data unit having a field that specifies a first number of beamforming training data units that can be communicated during a second training session to occur after the first training session. The training data including the first data unit is transmitted to a second device during the first training session. A second data unit received from the second device is processed to determine whether a request for the second device to participate in the second training session was accepted by the second device based on a first field of the second data unit. In response to determining that the request to participate in the second training session was accepted by the second device, the first number of beamforming training data units are transmitted during the second training session.

20 Claims, 17 Drawing Sheets

(56) References Cited

U.S. PATENT DOCUMENTS

| | | | |
|---|---|---|---|
| 7,627,348 | B2 | 12/2009 | Lysejko et al. |
| 7,742,390 | B2 | 6/2010 | Mujtaba |
| 7,778,607 | B2 | 8/2010 | Withers, Jr. et al. |
| 8,068,844 | B2 | 11/2011 | Li et al. |
| 8,116,819 | B2 | 2/2012 | Niu et al. |
| 8,289,869 | B2 | 10/2012 | Sawai |
| 8,331,419 | B2 | 12/2012 | Zhang et al. |
| 8,332,732 | B2 | 12/2012 | Lakkis |
| 8,351,521 | B2 | 1/2013 | Lakkis |
| 8,527,853 | B2 | 9/2013 | Lakkis |
| 8,619,907 | B2 | 12/2013 | Mujtaba et al. |
| 8,630,588 | B2 | 1/2014 | Liu et al. |
| 8,886,139 | B2 | 11/2014 | Zhang et al. |
| 2006/0105813 | A1 | 5/2006 | Nakao |
| 2008/0187003 | A1 | 8/2008 | Becker |
| 2010/0054223 | A1 | 3/2010 | Zhang et al. |

OTHER PUBLICATIONS

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999).

S. A. Mujtaba, "IEEE P802.11—Wireless LANS, TGn Sync Proposal Technical Specification," *The Institute of Electrical and Electronics Engineers, Inc.*, doc.: IEEE 802.11-04/0889r6, May 2005.

"IEEE 802.15.3™ Guide Addresses Untapped High-Rate Wireless Personal Area Network (WPAN) Market," *The Institute of Electrical and Electronics Engineers, Inc.*, available at http://standards.ieee.org/announcements/pr_802153wpanguide.html (2004).

Abstract of M.P. Wylie-Green et al., "Multi-band OFDM UWB solution for IEEE 802.15.3a WPANs," 2005 IEEE/Sarnoff Symposium on Advances in Wired and Wireless Communication, pp. 102-105 (Apr. 2005).

IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, Nov. 7, 2001.

International Search Report and Written Opinion for International Application No. PCT/US2010/024715, dated May 11, 2010.

International Preliminary Report on Patentability for International Application No. PCT/US2010/024715, dated Aug. 30, 2011.

IEEE P802.15 Working Group for Wireless Personal Area Networks (WPANs) mmWave Beamforming, Lakkis et al., Jan. 15, 2008.

IEEE Std 802.Nov. 2007 (revision of IEEE Std. 802.Nov. 1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, pp. 1-1184 (Jun. 12, 2007).

IEEE P802.11n™/D3.00, "Draft Standard for Information Technology-Telecommunications and information exchange between systems-Local and metropolitan area networks-Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, pp. 1-544 (Sep. 2007).

IEEE Std. 802.11n™ "IEEE Standard for Information Technology-Telecommunications and information exchange between systems-Local and metropolitan area networks-Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).

IEEE Std P802.11ad/D5.0 "Draft Standard for Information Technology-Telecommunications and information exchange between systems-Local and metropolitan area networks-Specific requirements, Part 11: Wireless LAN Medium Access Control (MAC) and Physical Layer (PHY) specifications: Amendment 3: Enhancements for Very High Throughput in the 60 GHz Band," "The Institute of Electrical and Electronics Engineers, Inc.", pp. 1-601 (Sep. 2011).

IEEE Std 802.15.3c/D00 (Amendment to IEEE Std 802.15.3-2003) "Draft Amendment to IEEE Standard for Information technology—Telecommunications and information exchange between systems—Local and metropolitan area networks—Specific requirements --Part 15.3: Wireless Medium Access Control (MAC) and Physical Layer (PHY) Specifications for High Rate Wireless Personal Area Networks (WPANs): Amendment 2: Millimeter-wave based Alternative Physical Layer Extension," *The Institute of Electrical and Electronics Engineers, Inc.*, 200 pages. (2008).

Gilb, James, "IEEE 802.15.3™ Guide Addresses Untapped High-Rate Wireless Personal Area Network (WPAN) Market," *The Institute of Electrical and Electronics Engineers, Inc.* (available at <http://standards.ieee.org/announcements/pr 802153wpanguide.html>) pp. 1-3 (May 18, 2004).

Harada, "Project: IEEE P802.15 Working Group for Wireless Personal Area Network (WPANs)," IEEE 802.15/07/0693-003c, slides 24-33 (May 2007).

Perahia, et al., "Gigabit Wireless LANs: an overview of IEEE 802.11ac and 80211ad," ACM Sigmobile Mobile Computing and Communications Review, vo. 15, No. 3, pp. 23-33 (Jul. 2011).

Pyo et al., "Throughput Analysis and Improvement of Hybrid Multiple Access in IEEE 802.13.3c mm-wave WPAN," IEEE J. on Selected Areas in Communications, vol. 27, No. 8, pp. 1414-1424 (Oct. 1, 2009).

van Nee, et al. "The 802.11n MIMO-OFDM Standard for Wireless LAN and Beyond," Wireless Personal Communications, vol. 37, pp. 445-453 (Jun. 2006).

Yeon, Myung-Hoon, et al., "Enhanced adaptive antenna algorithms for asynchronous TDMA systems," *42nd Annual Conference on Information Sciences and Systems (CISS 2008), Institute of Electrical and Electronics Engineers (IEEE)*, pp. 990-993 (Mar. 2008).

Zhang et al., "Applying Antenna Selection in WLANs for Achieving Broadband Multimedia Communications," *IEEE Trans. on Broadcasting*, vol. 52, No. 4, pp. 475-482 (Dec. 2006).

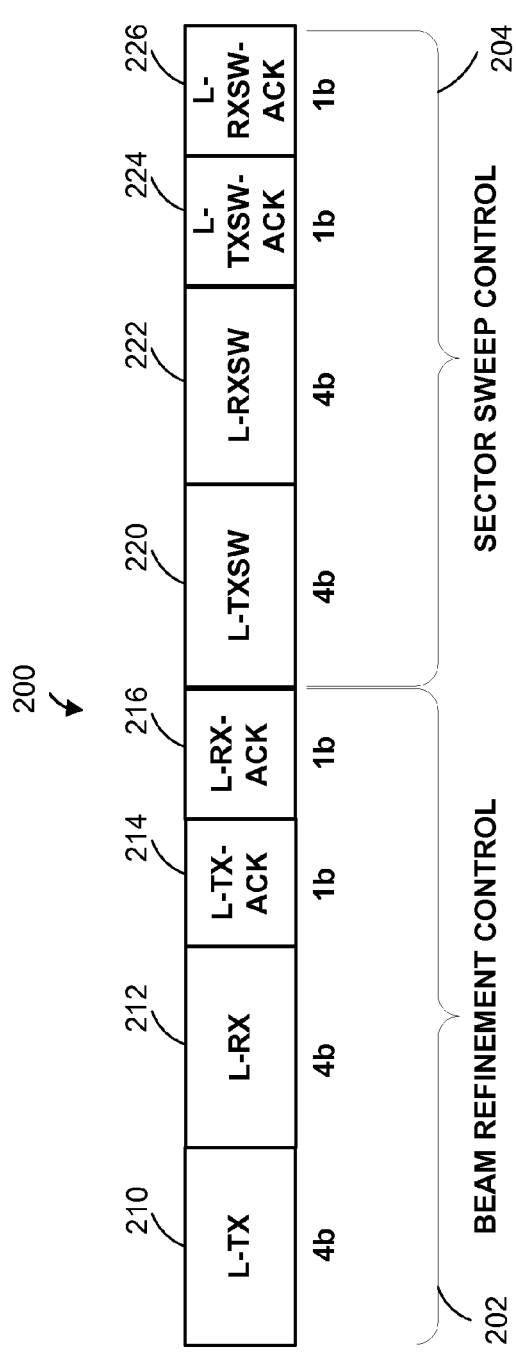
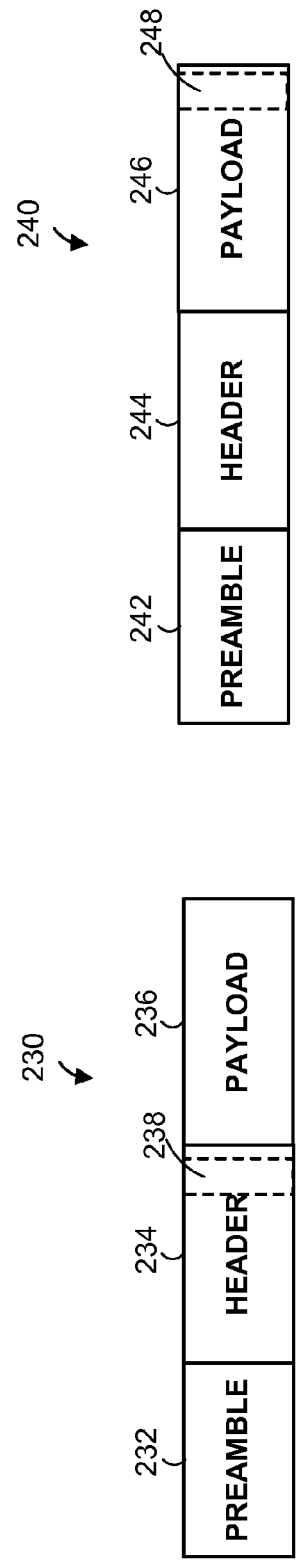
FIG. 5A
FIG. 5B
FIG. 5C

TECHNIQUES FOR FLEXIBLE AND EFFICIENT BEAMFORMING

CROSS REFERENCE TO RELATED APPLICATIONS

The present application is a continuation of U.S. patent application Ser. No. 12/709,115, now U.S. Pat. No. 8,509, 130, entitled "Techniques for Flexible and Efficient Beamforming," filed Feb. 19, 2010, which claims the benefit of U.S. Provisional Patent Application No. 61/154,985, filed Feb. 24, 2009, entitled "Flexible and Efficient Beamforming Training for mmWave Systems." The disclosures of the applications referenced above are hereby expressly incorporated herein by reference in their entireties.

FIELD OF TECHNOLOGY

The present disclosure relates generally to communication systems in which multiple devices transmit and receive data via a wireless communication channel and, more particularly, to communicating beamforming training information in such communication systems.

BACKGROUND

An ever-increasing number of relatively inexpensive, low power wireless data communication services, networks and devices have been made available over the past number of years, promising near wire speed transmission and reliability. Various wireless technology is described in detail in the 802 IEEE Standards, including for example, the IEEE Standard 802.11a (1999) and its updates and amendments, the IEEE Standard 802.11n, and the IEEE draft standards 802.15.3, and 802.15.3c now in the process of being finalized, all of which are collectively incorporated herein fully by reference.

As one example, a type of a wireless network known as a wireless personal area network (WPAN) involves the interconnection of devices that are typically, but not necessarily, physically located closer together than wireless local area networks (WLANs) such as WLANs that conform to the IEEE Standard 802.11a or the IEEE Standard 802.11n. Recently, the interest and demand for particularly high data rates (e.g., in excess of 1 Gbps) in such networks has increased. One approach to realizing high data rates in a WPAN is to use hundreds of MHz, or even several GHz, of bandwidth. For example, the unlicensed 60 GHz band provides one such possible range of operation.

As is known, antennas and, accordingly, associated effective wireless channels are highly directional at frequencies near or above 60 GHz. When multiple antennas are available at a transmitter, a receiver, or both, it is therefore important to apply efficient beam patterns using the antennas to better exploit spatial selectivity of the corresponding wireless channel. Generally speaking, beamforming or beamsteering creates a spatial gain pattern having one or more high gain lobes or beams (as compared to the gain obtained by an omni-directional antenna) in one or more particular directions, with reduced gain in other directions. If the gain pattern for multiple transmit antennas, for example, is configured to produce a high gain lobe in the direction of a receiver, better transmission reliability can be obtained over that obtained with an omni-directional transmission.

U.S. patent application Ser. No. 12/548,393, filed on Aug. 26, 2009, and entitled "Beamforming by Sector Sweeping," and U.S. Provisional Patent Application No. 61/091,914 entitled "Beamforming by Sector Sweeping," filed Aug. 26, 2008, are both expressly incorporated by reference herein in their entireties. These applications are generally related to a beamforming technique referred to as "beamforming by sector sweeping." In one implementation of beamforming by sector sweeping for determining a transmit beamforming pattern to be applied by a first device when transmitting data to a second device, the first device transmits a plurality of training packets to the second device, where the first device applies a different beamforming pattern when transmitting each training packet. The second device generally determines which of the training packets had the highest quality (e.g., had the highest signal-to-noise ratio (SNR), the lowest bit error rate (BER), etc.) and notifies the first device. The first device can then utilize the transmit beamforming pattern that yielded the highest quality packet. Similarly, to determine a receive beamforming pattern to be applied by the first device when receiving data from the second device, the second device transmits a plurality of training packets to the first device, and the first device applies a different beamforming pattern when receiving each training packet. The first device generally determines which of the training packets had the highest quality, and can then utilize the receive beamforming pattern that yielded the highest quality packet.

SUMMARY

In an embodiment, a method includes generating, at a first device, training data for a first training session between the first device and a second device, the training data including a first data unit to be transmitted during the first training session, wherein generating the first data unit includes generating a field of the first data unit that specifies a first number of beamforming training data units that can be communicated during a second training session to occur after the first training session, wherein the field of the first data unit that specifies the first number of beamforming training data units corresponds to a request for the second device to participate in the second training session. The method also includes causing the training data including the first data unit to be transmitted from the first device to the second device during the first training session. The method additionally includes processing, at the first device, a second data unit received by the first device, wherein the second data unit includes a response, by the second device, to the request, in the first data unit, for the second device to participate in the second training session, wherein processing the second data unit includes determining whether the request for the second device to participate in the second training session was accepted by the second device based on a first field of the second data unit, wherein the first field of the second data unit is a single bit, wherein a first value of the first field indicates that the request for the second training session is accepted by the second device, and wherein a second value of the first field indicates that the request the second training session is rejected by the second device. The method further includes, in response to determining that the request to participate in the second training session was accepted by the second device, causing the first number of beamforming training data units to be transmitted by the first device during the second training session.

In another embodiment, an apparatus comprises a transceiver device configured to: generate a beamforming training (BFT) control information element (IE) to be transmitted during a first beamforming training session, wherein the transceiver device is configured to generate a first field of the BFT control IE that specifies a first number of training data units to be communicated to a communication device during a second beamforming training session to occur after the first beamforming training session, wherein the first field corresponds to a request for the communication device to participate in the second beamforming training session, and wherein the second beamforming training session corresponds to transmit beamforming training; generate a first data unit to be transmitted during the first beamforming training session, wherein the first data unit includes the BFT control IE and training data for the first beamforming training session; process a second data unit received from the communication device, wherein the second data unit includes a response, by the communication device, to the request, in the first data unit, for the communication device to participate in the second training session, wherein processing the second data unit includes determining whether the request for the communication device to participate in the second training session was accepted by the communication device based on a first field of the second data unit, wherein the first field of the second data unit is a single bit, wherein a first value of the first field indicates that the request for the second training session is accepted by the communication device, and wherein a second value of the first field indicates that the request the second training session is rejected by the communication device; and in response to determining that the request to participate in the second training session was accepted by the communication device, cause the first number of beamforming training data units to be transmitted during the second training session

BRIEF DESCRIPTION OF THE DRAWINGS

FIG. 5A is a block diagram of an example information element that can be used in a communication frame to control beamforming training;

FIG. 5B is a block diagram of an example communication frame that includes an information element, in the header of the frame, to control beamforming training;

FIG. 5C is a block diagram of an example communication frame that includes an information element, in the payload of the frame, to control beamforming training;

DETAILED DESCRIPTION

Figure 1A:
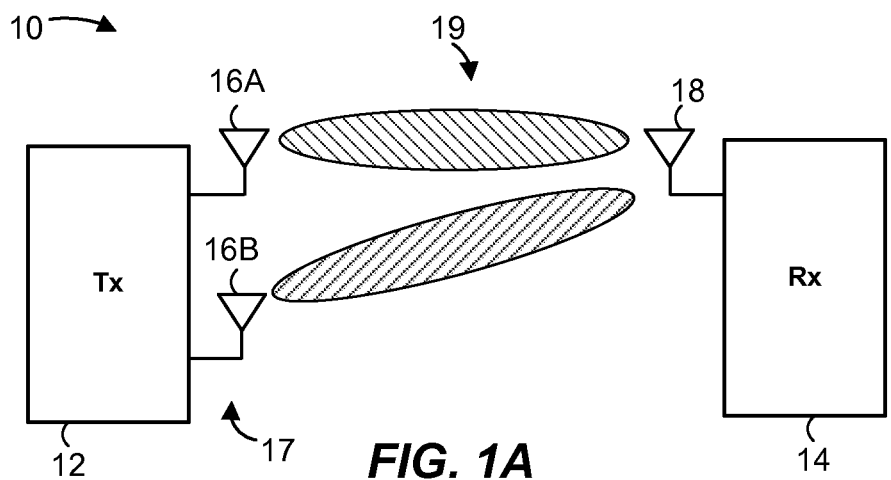
FIG. 1A is a block diagram of a communication system including a transmitter having multiple antennas and a receiver having a single antenna.
Figure 1B:
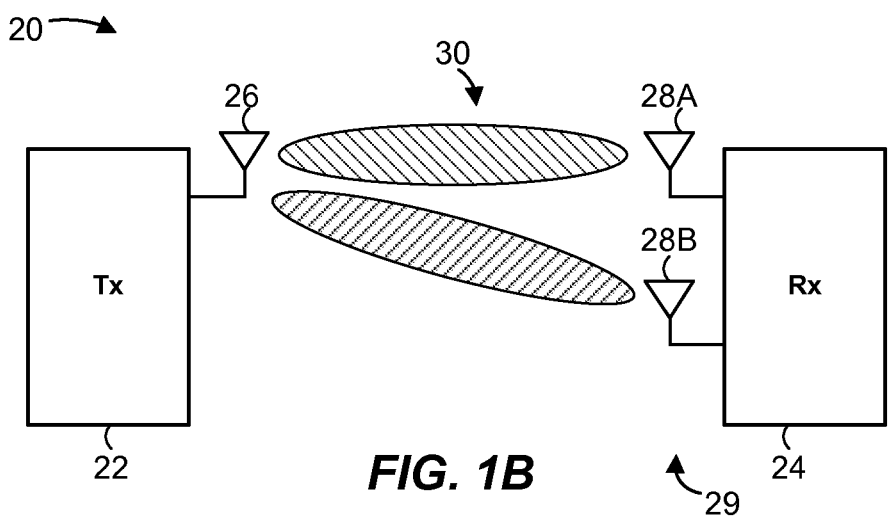
FIG. 1B is a block diagram of a communication system including a transmitter having a single antenna and a receiver having multiple antennas.
Figure 1C:
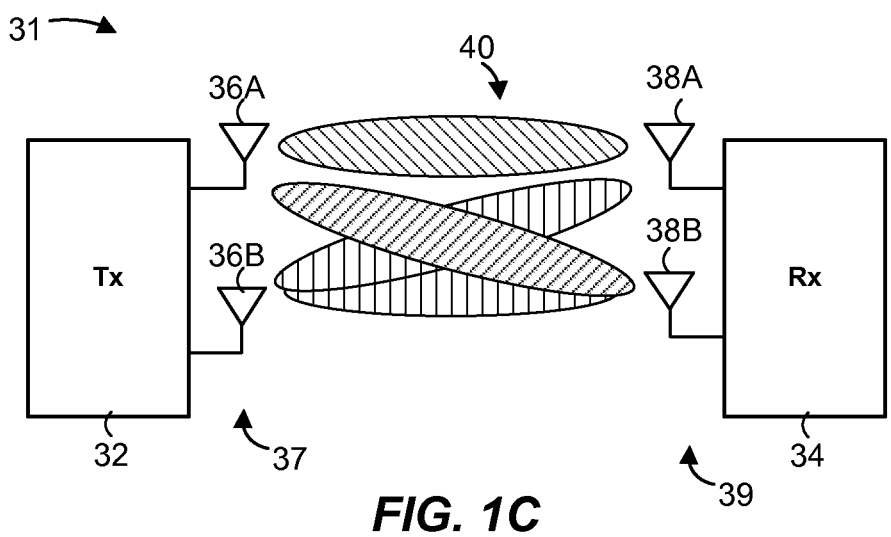
FIG. 1C is a block diagram of a communication system including a transmitter having multiple antennas and a receiver having multiple antennas.

FIGS. 1A-1C are block diagrams of several examples of communication systems that can use techniques for efficiently communicating control information related to transmit or receive beamforming sector sweeping and/or related to transmit and/or receive beam refinement. As discussed in detail below, devices or stations operating in these or similar communication systems can generate frames that include beamforming requests as well as beamforming responses that significantly reduce overhead and improve flexibility of beamforming training. A device that does not support beamforming training, or wishes to reject a beamforming training request for another reason, can thus transmit a frame to prevent a peer device from initiating a beamforming session. Further, a device can use the formatting techniques discussed below to interrupt a beamforming training process if, for example, one or several already completed beamforming training sessions have already yielded an acceptable steering vector. Still further, devices when necessary can request multiple sessions of beamforming sector sweeping or beam refinement.

For simplicity, FIGS. 1A-1C illustrate systems in which only two devices are communicating with each other. However, as described further below, a system can also include more than two devices, and one device can communicate with several other devices. In any event, FIG. 1A illustrates a wireless communication system 10 in which a station or transmitting device 12 transmits information over a wireless communication channel to another station or receiving device 14. In general, the transmitted information can be in the form of one or more data units (e.g. packets, frames, etc). Each of the devices 12 and 14 can be a base station or a mobile station, for example. In the example of FIG. 1A, the transmitting device 12 is equipped with two or more antennas 16 defining an antenna array 17, while the receiving device 14 is equipped with a single antenna 18. The wireless communication system 10 is thus a multiple input, single output (MISO) system. For the purposes of simplicity and conciseness, the transmitting device 12 is illustrated with only two antennas 16A and 16B.

However, it will be noted that the transmitting device 12 can generally have any desired number of antennas.

During transmission, the transmitting device 12 controls the phase and/or amplitude of a signal at each of the antennas 16A and 16B to define a radiation or gain pattern 19. Specifically with respect to controlling phases, the transmitting device 12 selects a steering vector (or "phasor") that specifies a set of phase shifting angles, and applies the steering vector to the antenna array 17 to thereby define a phased antenna array. The steering vector can specify a 0° phase shift for the antenna 16A and a 35° phase shift for the antenna 16B, for example. In this manner, the steering vector defines a direction of transmission or reception of the antenna array 17 that may be referred to as a "sector."

Similarly, a wireless communication system 20 (see FIG. 1B) is a single input, multiple output (SIMO) system that includes a station or transmitter 22 and a station or receiver 24, with the transmitter 22 having a single antenna 26 and the receiver 24 having multiple antennas 28 arranged in an antenna array 29. The transmitter 22 transmits a signal to the receiver 24 via the single antenna 26, and the receiver defines a gain pattern 30 by controlling phase shifting angles at the antennas 28A-28B using a corresponding steering vector.

Meanwhile, a wireless communication system 31 illustrated in FIG. 1C is a multiple input, multiple output (MIMO) system in which each of a station or transmitter 32 and a station or receiver 34 is equipped with multiple antennas (antennas 36A-36B defining an antenna array 37, and antennas 38A-38B defining an antenna array 39). Each of the transmitter 32 and the receiver 34 can apply steering vectors to the respective antenna array 36 or 38 to define gain patterns 40.

Next, a brief overview of a general technique for performing beamforming training will be described as background with reference to FIGS. 2A and 2B, followed by a discussion of an example beamforming training protocol with reference to FIGS. 3 and 4. Example methods and apparatus for communicating beamforming training control information to improve the efficiency and flexibility of beamforming sector sweeping or beam refinement are then discussed in detail with reference to FIGS. 5A-15.

Overview of Beamforming Training

Generally speaking, a station equipped with multiple antennas and operating in a MIMO environment (or in one of degenerate forms of MIMO such as SIMO or MISO) may use a transmit steering vector $u_{TX}$ to define a gain pattern when transmitting outbound data and a receive steering vector $u_{RX}$ to define a gain pattern when receiving inbound data. By extension, when a pair of multi-antenna devices (e.g., devices 32 and 34) exchange data in both directions, these devices may define steering vectors $u_{TX}^1$, $u_{RX}^1$, $u_{TX}^2$, and $u_{RX}^2$. Further, an antenna array may sometimes operate in an omni receive pattern mode or quasi-omni receive pattern mode (i.e., closely approximating the omni mode) $omni_{RX}$ in which the antenna array does not reinforce or suppress power of signals from any particular direction, or in an omni or quasi-omni transmit pattern mode $omni_{TX}$ in which the antenna array does not reinforce or suppress power of transmitted signals in any particular direction. For the purposes of conciseness, both omni and quasi-omni modes are referred to as "omni" modes below.

Figure 2A:
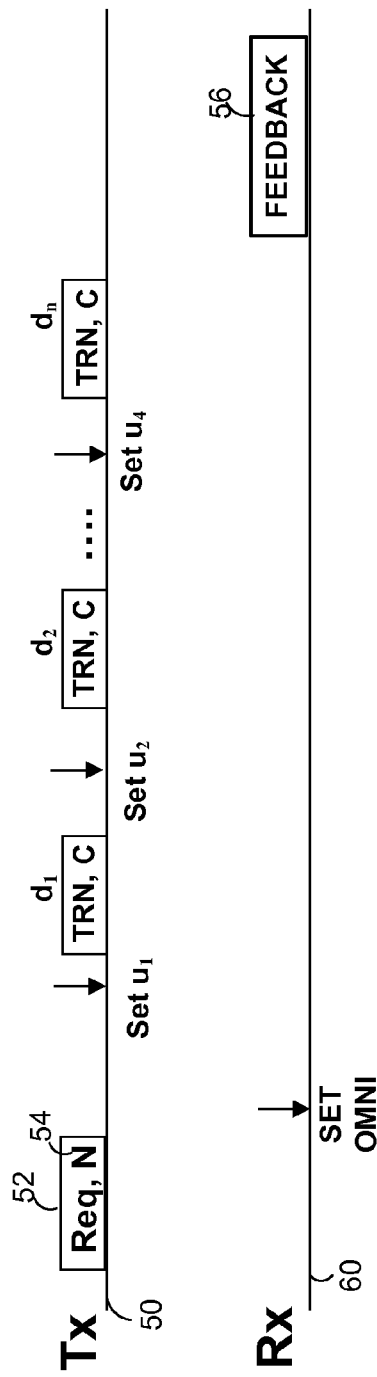
FIG. 2A is a timing diagram that illustrates using transmit beamforming training to select a transmit steering vector.

FIG. 2A is a timing diagram that illustrates data transmitted during a beamforming training session between a multi-antenna station 50 (Tx) and another station 60 (Rx). It will be noted that the beamforming training session of FIG. 2A can be a sector sweep or a refinement session. The station 50 includes two or more antennas, whereas the station 60 may include one or more antennas. To identify an efficient (or, at least, a relatively good) transmit steering vector $u_{TX}$, the multi-antenna station 50 may iteratively apply a series of transmit steering vectors $u_1, u_2, \ldots u_n$ to the antenna array of the station 50 and transmit respective training data units (e.g., packets, frames, etc.) $d_1, d_2, \ldots d_n$ via the antenna array for the transmit steering vectors $u_1, u_2, \ldots u_n$. Thus, each of the training data units $d_1, d_2, \ldots d_n$ corresponds to one of the transmit steering vectors $u_1, u_2, \ldots u_n$ (e.g., $d_1$ corresponds to $u_1$, $d_2$ corresponds to $u_2$, etc.) Preferably, the peer station 60 receives the training data units $d_1, d_2, \ldots d_n$ using the same receive steering vector (or an omni or quasi-omni transmit pattern mode, a single antenna, etc.) so as to assess the quality of received data units $d_1, d_2, \ldots d_n$ in view of the parameters of only the transmitting antenna array of the transmitting station 50.

Prior to transmitting the training data units $d_1, d_2, \ldots d_n$, the station 50 can transmit a request message 52 to the station 60 to request that the peer station 60 begin receiving the series of data units $d_1, d_2, \ldots d_n$. As illustrated in FIG. 2A, the request message 52 includes a count 54 that specifies the number N of data units in the sequence $d_1, d_2, \ldots d_n$. Following the communication of the N data units, the station 60 can assess the quality of each received data unit $d_1, d_2, \ldots d_n$, using any desired technique and transmit a feedback message 56 to the station 50. The station 50 may then select or generate a transmit steering vector $u_{TX}$ from or based on the feedback message 56.

Figure 2B:
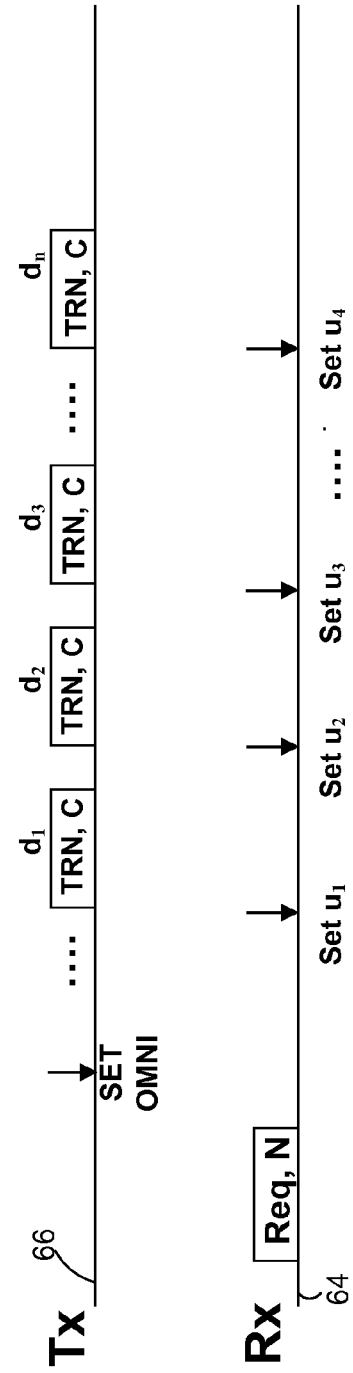
FIG. 2B is a timing diagram that illustrates using receive beamforming training to select a receive steering vector.

Referring to FIG. 2B, a multi-antenna station 64 can identify an efficient receive steering vector $u_{RX}$ by requesting that a peer station 66 transmit N data units $d_1, d_2, \ldots d_n$, iteratively applying a series of receive steering vectors $u_1, u_2, \ldots u_n$ to the antenna array of the station 64, and receiving all or some of training data units for some or all of the receive steering vectors $u_1, u_2, \ldots u_n$. In this sense, each of the receive steering vectors $u_1, u_2, \ldots u_n$ corresponds to one of the training data units $d_1, d_2, \ldots d_n$ (e.g., $u_1$ corresponds to $d_1$, $u_2$ corresponds to $d_2$, etc.), although some of the data units $d_1, d_2, \ldots d_n$ may not always reach the station 64. The station 64 may assess the quality of each received data unit $d_1, d_2, \ldots d_n$, using any desired technique. Preferably, the peer station 66 transmits the training data units $d_1, d_2, \ldots d_n$ using the same transmit steering vector so as to allow the receiving station 50 to assess the quality of received data units $d_1, d_2, \ldots d_n$ in view of the parameters of only the receiving antenna array. The station 64 may then select or generate a receive steering vector $u_{RX}$ from or based on the set of steering vectors $u_1, u_2, \ldots u_n$ based on the relative quality of received data units.

In some embodiments, the receive steering vector $u_{RX}$ need not precisely match any of the steering vectors $u_1, u_2, \ldots u_n$, and the station 64 may use the quality metrics associated with the received sequence of data units $d_1, d_2, \ldots d_n$ to extrapolate or generate the desired receive steering vector $u_{RX}$. In other embodiments, the station 64 may average several steering vectors u (e.g., top two, top three, etc.) to generate the receive steering vector $u_{RX}$, and this technique may be referred to as beam refining. In general, it is possible to apply any suitable algorithm to generate the receive steering vector $u_{RX}$ based on the assessed quality of data units corresponding to the set $u_1, u_2, \ldots u_n$ (or a subset thereof).

Referring to FIGS. 2A and 2B, for some well-calibrated multi-antenna stations, the effective wireless channels H may be reciprocal in forward and reverse directions (i.e., $H_{FW} = H_{RV}^T$), and the transmit and receive properties of the pairs of stations 50, 60 and 64, 66 may be symmetrical. In these cases, the stations 50 and 60 (or 66 and 66) may realize bidirectional beamforming using sector sweeping in only one direction. As one example, the station 64 may determine the receive steering vector $u_{RX}$ using the beamforming training as discussed above, and then set the transmit steering vector of the station 64 $u_{TX}$ to $u_{RX}$.

An Example Beamforming Protocol

Figure 3:
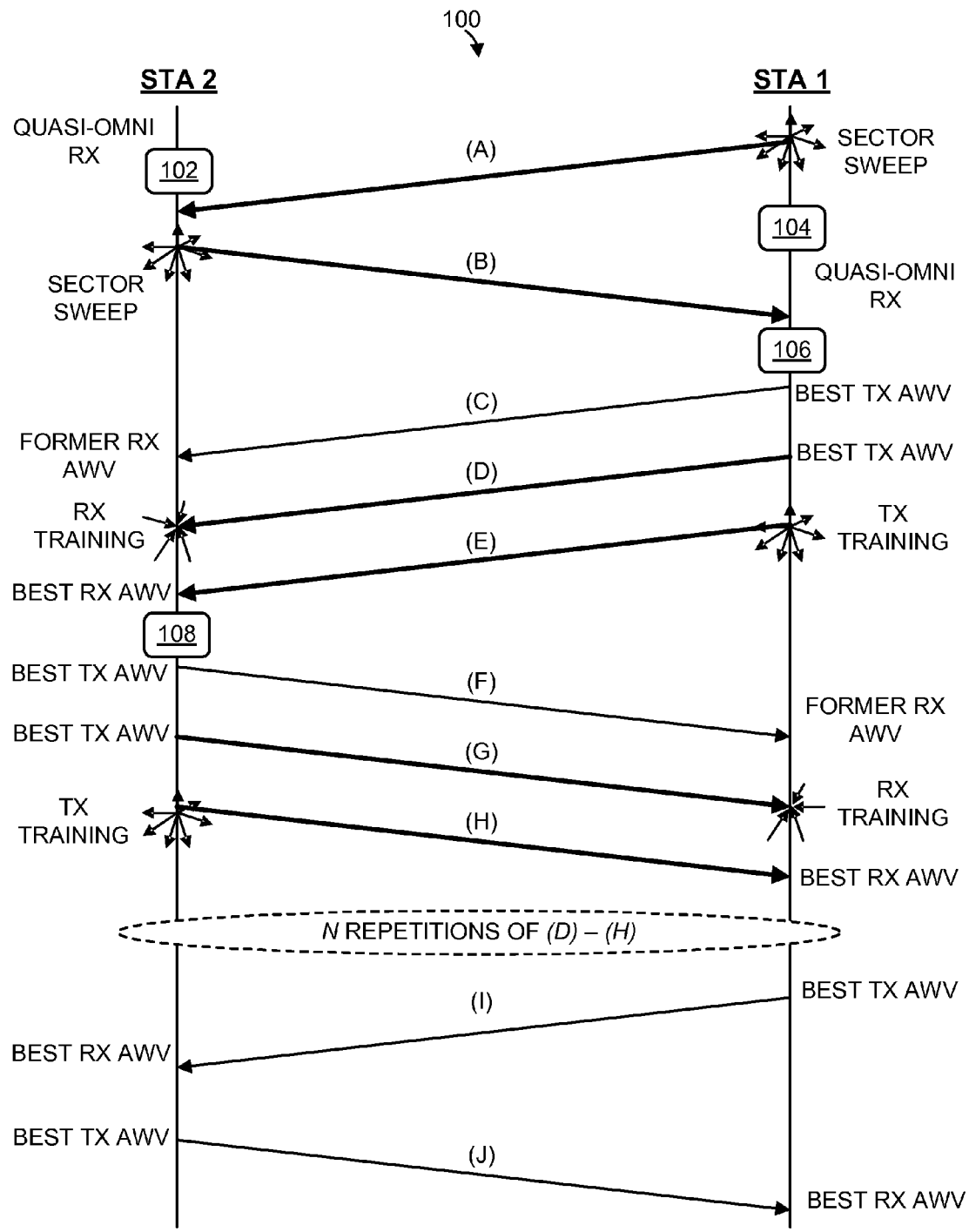
FIG. 3 is a timing diagram that illustrates an example of information exchanges between stations to implement a beamforming training protocol.
Figure 4:
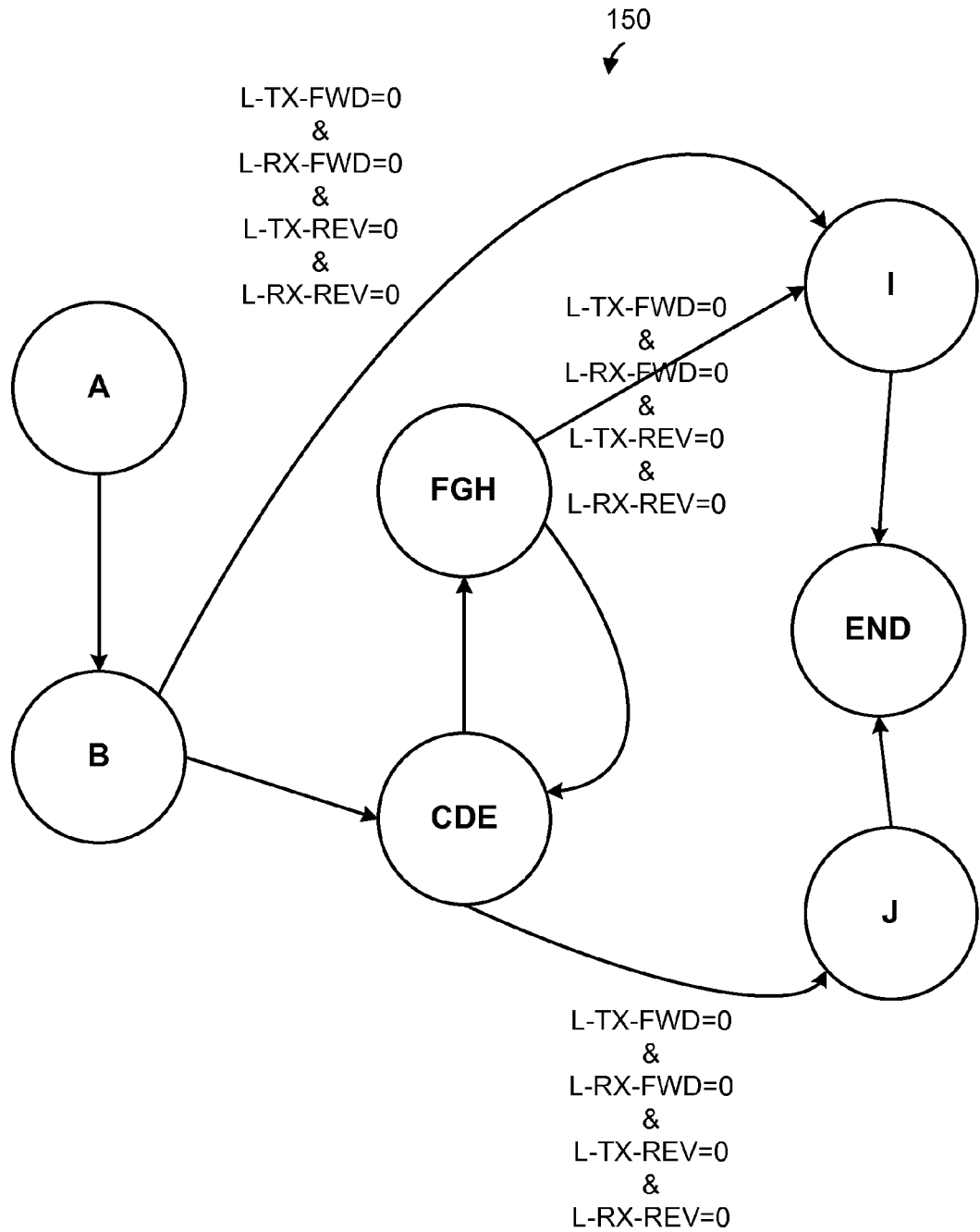
FIG. 4 is a state diagram that illustrates an example beamforming training protocol.

FIG. 3 is a timing diagram that illustrates a method 100 that a pair of communicating devices (e.g., 32 and 34 of FIG. 1C) can implement to support beamforming according to an example beamforming protocol. The protocol with which the method 100 is consistent mandates a single session of joint bidirectional Tx and Rx sector sweeping followed by multiple rounds of Tx and Rx beam refinement. If implemented by a pair of multi-antenna devices 32 and 34, for example, station 2 with a timeline illustrated on the left may correspond to the device 34, and station 1 with a timeline illustrated on the right may correspond to the device 32. However, it will be understood that the terms "transmitter"/"transmitting device" and "receiver"/"receiving device" merely refer to operational states of physical devices and are not intended to always limit these devices to only receiving or transmitting in the respective communication network. For example, the device 34 in FIG. 1C may operate as a transmitter and the device 32 may operate as a receiver at some point during operation.

In state 102, station 2 sets its antenna array to an omni receive pattern mode $omni_{RX}$ in preparation for a sector sweeping procedure for Tx beamforming that station 1 initiates to determine the transmit steering vector $u_{TX}^1$. Stations 1 and 2 may have negotiated the timeslot for the Tx beamforming procedure in advance or, as another example, a network controller may have allocated one or several timeslots for some or all of the message exchanges of the method 100. Station 1 transmits a sequence A of training data units which may be similar to the data units $d_1, d_2, \ldots d_n$ discussed with reference to FIG. 2A. The sequence A can include data units of equal size spaced apart at equal intervals. In at least some of the embodiments, each data unit has a respective identifier such as a sequence number, for example. Station 1 utilizes a different steering vector u for transmitting each training data unit in the sequence A.

Each training data unit in the sequence A can include an information element (IE) that includes fields L-TX and L-RX to specify numbers of training data units to be transmitted during Tx and Rx beam refinement procedures, respectively. By setting the field L-TX or L-RX to zero, station 1 can indicate that beam refinement is not expected for transmit or receive beamforming, respectively. For clarity, the fields L-TX and L-RX transmitted from station 1 and station 2 are referred to below as L-TX-FWD and L_RX-FWD, respectively, while similar fields of an IE transmitted from station 2 to station 1 are referred to as L-TX-REV and L-RX-REV.

Next, station 1 sets its antenna array to an omni receive pattern mode in state 104. Station 2 performs a Tx beamforming sector sweep procedure to determine the transmit steering vector $u_{TX}^2$ by sending a sequence B of training data units (while iteratively switching the steering vector u) that also includes an IE specifying the feedback to the Tx sector sweeping procedure of station 1 (e.g., an identifier of a best received data unit). The training data units in the sequence B can also include an IE that specifies L-TX-REV and L-RX-REV.

Upon processing the sequence B, station 1 transitions to a state 106 and responds to station 2 with a feedback message C including feedback information for the Tx beamforming sector sweeping procedure at station 2. When transmitting the feedback message C, station 1 also selects and applies the transmit steering vector indicated by the feedback IE sent during the sequence B to the antenna array of station 1. If stations 1 and 2 are well calibrated, sending of Rx sector sweep beamforming sequences may be unnecessary. Instead, station 1 can simply assign the $u_{RX}^1 = u_{TX}^1$, and station 2 may similarly assign $u_{RX}^2 = u_{TX}^2$.

With continued reference to FIG. 3, the stations conduct beam refinement training using techniques similar to sector sweeping. In particular, station 1 transmits a sequence D that includes as many beam refinement training data units to station 2 as specified by L-RX-REV. Station 2 can then apply the receive steering vector identified during the receive beam refinement procedure, and prepare for receiving a sequence E of training data units which station 1 transmits during a transmit beam refinement procedure. The number of training data units in the sequence E is equal to L-TX-FWD.

Upon receiving the sequence E, station 2 transitions to state 108, applies the best known transmit steering vector to the antenna array of station 2, and transmits feedback information related to transmit beam refinement training of station 1 in a message F. In an embodiment, the best known transmit steering vector is a quasi-omni mode steering vector. In another embodiment, station 2 provisionally sets the transmit steering vector to the previously determined receive steering vectors (i.e., utilizes the results of receive beamforming training until the results of transmit beamforming training become available). Next, in sequence G, station 2 transmits as many training data units to station 1 as specified by L-RX-FWD. After receive beam refinement training of station 1 with sequence G has been completed, station 2 proceeds to transmit a sequence H as a part of transmit beam refinement training of station 2. As further illustrated in FIG. 3, beam refinement (i.e., transmitting the messages/sequences D-H) in some cases is conducted multiple times. Finally, station 1 transmits message I to station 2 to provide feedback in connection with the transmit beam refinement training of station 2, and station 2 transmits a message J with similar feedback information to station 1.

The beamforming protocol discussed above contemplates that some of the messages or sequences A-J can be omitted. For example, messages or sequences can be omitted when transmit/receive reciprocity is utilized and/or when one of the devices has only one antenna. As another example, messages or sequences can be omitted if beam refinement is not utilized. Referring to FIG. 4, a state diagram 150 illustrates several states, each associated with transmitting or receiving one or several or the messages or sequences A-J, and several transitions consistent with the protocol discussed above with reference to FIG. 3. Further, FIG. 4 illustrates example values of L-TX-FWD, L-RX-FWD, L-TX-REV, and L-RX-REV for some of the transitions. It will be noted, for example, that the transition from the state in which a station transmits or receives sequence B to the state in which the station transmits or receives message I occurs when neither the stations nor the peer station wishes to refine beamforming in transmit or receive direction (i.e., each of L-TX-FWD, L-RX-FWD, L-TX-REV, and L-RX-REV is zero).

It will be noted that although a device can choose to request or skip beam refinement training, the device cannot reject a command to conduct beam refinement training received from a peer device. As a result, a device operating in a network necessarily must support the beam refinement protocol adapted in the network. Further, a device cannot interrupt a receive beam refinement session already in progress even if the device determines, on the basis on the received partial sequence of training data units, that an acceptable receive steering vector has been identified. Still further, the protocol discussed above does not allow devices to skip transmit beamforming sector sweeping and, on the other hand, does not permit devices to conduct receive beamforming sector sweeping. Moreover, the protocol does not contemplate multiple sector sweep sessions.

To improve the flexibility of beam refinement, a two-frame receive beam refinement handshake can be followed by a transmit beam refinement session that spans at least four frames. For example, a protocol can mandate that a device transmit a request for receive beam refinement and receive a receive beam refinement response prior to determine whether the peer device will transmit a series of beam refinement training data units. Similarly, a device can transmit a request for transmit beam refinement training, receive a confirmation from a peer device that the request for transmit beam refinement training has been accepted, transmit one or multiple training data units to the peer device, and receive a transmit beam refinement response including feedback information. However, as will be noted, this example protocol introduces additional overhead. A one round of a bi-directional beam refinement requires at least 12 frames, for example.

An Efficient and Flexible Beamforming Protocol

Now referring to FIG. 5A, an example beamforming training (BFT) control IE 200 can be used in communication frames to further improve the flexibility of beamforming, and to reduce the overhead associated with communicating beamforming control information. The example IE 200 includes one or both of a beam refinement control element 202 and a sector sweep control element 204. The beam refinement control element 202 includes an L-TX field 210, an L-RX field 212, an L-TX-ACK field 214, and an L-=RX-ACK field 216. Similarly, the sector sweep control element 204 includes an L-TXSW field 220, an L-RXSW field 222, an L-TXSW-ACK field 224, and an L-RXSW-ACK field 226. As discussed in detail below, the beam refinement control element 202 and the sector sweep control element 204 specify the beamforming procedures desired by the station that transmits the BFT control IE 200, as well as approval or rejection of similar requests for beamforming procedures requested by a peer station.

The L-TX field 210 specifies a number of training data units, such as the data units $d_1, d_2, \ldots d_n$ discussed with reference to FIG. 2A, a station wishes to transmit during a transmit beam refinement training session, and the L-RX field 212 specifies a number of training data units, such as the data units $d_1, d_2, \ldots d_n$ discussed with reference to FIG. 2B, the station wishes to receive during a receive beam refinement training session. In some embodiments, each of the fields 210 and 212 is four-bit field. In other embodiments, the fields 210, 212 can be different numbers of bits, i.e., more or less than four bits. A certain value, such as zero, can indicate that the station does not wish or is not capable of conducting the corresponding beam refinement training session.

The fields 214 and 216 can be single-bit fields to indicate either confirmation or rejection of a corresponding beamforming request from a peer station. Referring back to FIG. 1C, for example, the station 32 can transmit a frame to the station 34 including the IE 200 with the L-TX field 210 set to N>0. In response, the station 34 can transmit a frame to the station 32 that similarly includes the IE 200, and in which the L-TX-ACK field 214 is set to 0. The station 32 can accordingly skip the transmit beam refinement procedure. If, on the other hand, the station 32 receives a frame in which the L-TX-ACK field 214 is set to 1, the station 32 can proceed to transmit N data units to the station 34 during a transmit beam refinement procedure. Similarly, the L-RX-ACK field 216 set to 0 can indicate a rejection of a request of a peer station for a certain number of training data units, and the L-RX-ACK field 216 set to 1 can indicate that the device has granted such a request. As discussed in more detail below, it is also possible to use the fields 214 and 216 to reject potential transmit and receive beam refinement requests that a peer station may transmit in the future (i.e., reject beam refinement requests before the fact).

Further, devices can utilize the fields 220-226 in a similar manner. In this manner, devices can efficiently and independently negotiate each of the eight possible BFT sessions: receive beam refinement in the direction from a first station to a second station, transmit beam refinement in the direction from the first station to the second station, receive beam refinement in the direction from the second station to the first station, transmit beam refinement in the direction from the second station to the first station, receive sector sweeping in the direction from the first station to the second station, transmit sector sweeping in the direction from the first station to the second station, receive sector sweeping in the direction from the second station to the first station, and transmit sector sweeping in the direction from the second station to the first station.

If desired, the fields 214 and 216 can occupy more bits and can indicate the number of training data units a station will transmit or receive during a BFT procedure of the peer station. In these embodiments, a station can use the fields 214 and 216 for detailed confirmation (e.g., a station that transmits a frame with L-TX=N to a peer station and checks whether L-TX-ACK=N in a frame transmitted from the peer station). Alternatively, stations can use fields 214 and 216 to "counter-offer" a request (e.g., a station that transmits a frame with L-TX=$N_1$ to a peer station and receives a frame with L-TX-ACK=$N_2$ in a frame transmitted in response from the peer station).

With continued reference to FIG. 5A, devices can use the fields 220-226 in a similar manner. More specifically, a station can request transmit sector sweep beamforming and receive sector sweep beamforming using the fields 220 and 222, respectively, and accept or reject sector sweep beamforming requests from other stations using the fields 224 and 226.

In general, a beamforming control IE can include one or both of the beam refinement control element 202 and the sector sweep control element 204. For example, a protocol can mandate that sector sweep beamforming be mandatory with a certain defined number of training data units, and that beam refinement be optional with a variable number of training data units. Depending on the desired implementation, the beamforming control IE can also include an information element identifier (not shown in FIG. 5A).

The beamforming control IE can be used in any portion of a communication frame. Referring to FIG. 5B, an example communication frame 230 includes a preamble 232, a header 234, and a payload 236. The header 234 includes a beamforming control IE 238 that may be formatted similar to the beamforming control IE discussed with reference to FIG. 5A. As another example, FIG. 5C illustrates a communication frame 240 with a preamble 242, a header 244, a payload 246, and a beamforming control IE 248 in the payload of the frame 240, where the beamforming control IE 248 is formatted similar to the beamforming control IE 200 of FIG. 5A.

Figure 6:
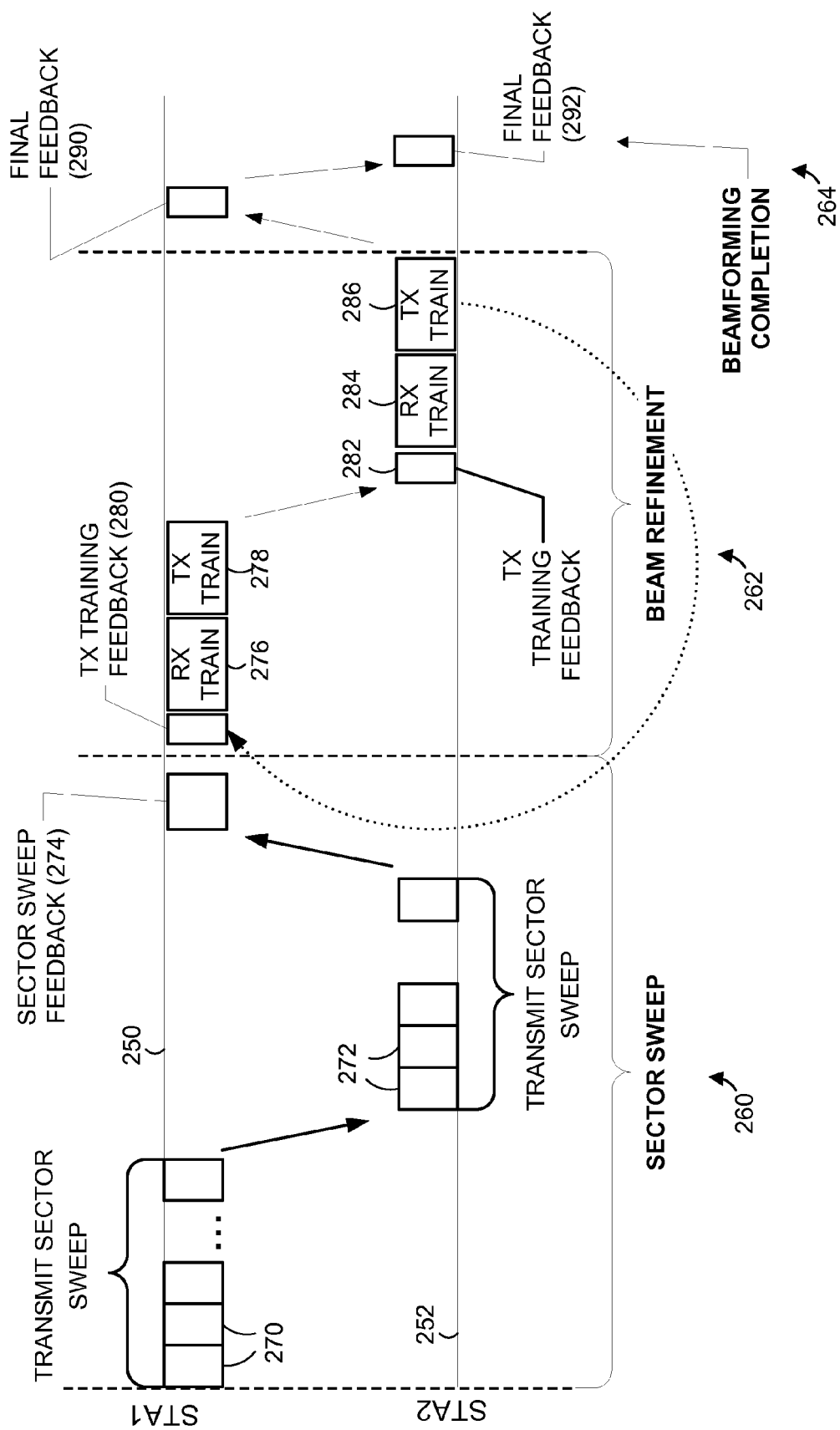
FIG. 6 is a block diagram that illustrates sector sweep and refinement stages of beamforming training between two stations.

FIG. 6 is a timing diagram illustrating stations 250 and 252 exchanging frames during a sector sweep beamforming stage 260, a beam refinement stage 262, and a beamforming completion stage 264. A BFT control IE similar or identical to the BFT control IE 200 illustrated in FIG. 5A can be used in frames transmitted during one or several of the stages 260-264. For example, frames 270 and 272 are sector sweep frames, i.e., data units used in sector sweep beamforming training. The station 250 transmits the frames 270 during transmit beamforming sector sweeping, and the station 252 transmits frames 272 during a similar session of transmit beamforming sector sweeping. The frames 270 can include a BFT control IE to indicate whether the station 250 wishes to conduct transmit and receive beam refinement. In some embodiments, the frames 270 can also indicate whether the station 250 supports transmit or receive beamforming sector sweeping conducted by peer devices such as the station 252.

The station 250 transmits a frame 274 to provide feedback regarding the session of transmit beamforming sector sweeping conducted by the station 252. Next, the station 250 transmits one or several frames 276 during receive beam refinement of the station 252, and one or several frames 278 during transmit beam refinement of the station 250. In subsequent iterations of the beam refinement session 262, the station 250 can also transmit a transmit beam refinement feedback frame 280. Some or all of the frames 274-280 can include a BFT control IE. In a typical scenario, the BFT control IE in the frames 274-280 no longer requires sector sweeping, i.e., includes L-TXSW=0 and L-RXSW=0. Also, some or all of the frames or 274, 276, and 278 in some embodiments can omit the BFT control IE to decrease overhead.

With continued reference to FIG. 6, the station 252 transmits a frame 282 to provide feedback regarding the session of transmit beamforming sector sweeping conducted by the station 250. The station 252 then transmits one or several frames 284 during receive beam refinement of the station 250, and one or several frames 286 during transmit beam refinement of the station 252. Similar to frames transmitted by the station 250, some or all of the frames 282-286 can include a beamforming training control IE.

In FIG. 6, arrows indicate an example sequencing of the frames. Thus, the first one of the frames 272 is scheduled after the last one of the frames 270, the transmit beam refinement feedback frame 280 is scheduled following the corresponding transmit beam refinement frames 286, etc. Following the beam refinement stage 262, the station 250 transmits a final feedback frame 290, and the station 252 transmits a final feedback frame 292. The beamforming training control IE in the frames 290 and 292 specifies L-TX=0 and L-RX=0 in both directions to indicate that beam refinement is completed.

From the foregoing, it will be appreciated that a beamforming training control IE can be in included in sector sweep frames, sector sweep feedback frames, transmit beam refinement training frames, and final feedback frames. To better illustrate the use of a beamforming training control IE to efficiently control sector sweeping and beam refinement sessions, several example scenarios are discussed below with reference to FIGS. 7-12. First, however, the use of a beamforming training control IE to implement a bi-directional transmit and receive beam refinement is discussed with reference to FIG. 3.

As discussed above, a beamforming training control IE (such as the IE 200 discussed with reference to FIG. 5A) can include both an element to control beam refinement training and an element to control sector sweep training. For simplicity of illustration, however, Table 1 provided below lists only the values of fields included in the beam refinement training control element. Each row in the Table 1 identifies one of the messages of sequences A-J along with the corresponding values of L-TX, L-TX-ACK, L-RX, and L-RX-ACK.

TABLE 1

| Message/Sequence | Field/Value |
|---|---|
| A | L-TX > 0, L-TX-ACK = 0, L-RX > 0, L-RX-ACK = 0 |
| B | L-TX > 0, L-TX-ACK = 1, L-RX > 0, L-RX-ACK = 1 |
| C | L-TX > 0, L-TX-ACK = 1, L-RX > 0, L-RX-ACK = 1 |
| F | L-TX > 0, L-TX-ACK = 1, L-RX > 0, L-RX-ACK = 1 |
| I/J | L-TX = 0, L-TX-ACK = 0, L-RX = 0, L-RX-ACK = 0 |

Thus, referring back to FIG. 3, station 1 can set L-TX in frames of the sequence A to $N_1 > 0$ and L-RX in these frames to $N_2 > 0$, for example, to indicate to station 2 that station 1 wishes to refine the transmit steering vector by transmitting $N_1$ training data units, and refine the receive steering vector by receiving $N_2$ training data units from station 2.

Regarding the fields L-TX-ACK and L-RX-ACK, it will be noted that frames transmitted as a part of the sequence A do not provide feedback to frames previously from station 2. Thus, in one embodiment, station 1 can set each of the fields L-TX-ACK and L-RX-ACK to zero. In another embodiment, station 1 can use the fields L-TX-ACK and L-RX-ACK to indicate whether station 1 wishes to support (or is capable of supporting) respective transmit and receive beam refinement sessions of station 2.

When generating the frames in the sequence B, station 2 can set L-TX to $N_3 > 0$ and L-RX to $N_4 > 0$ to indicate that station 1 wishes to refine the transmit steering vector by transmitting $N_3$ training data units, and refine the receive steering vector by receiving $N_4$ training data units from station 1. Further, station 2 can accept the transmit beam refinement request by setting L-TX-ACK=1 and accept the receive beam refinement request by setting L-RX-ACK=1. Thus, L-TX-ACK in the sequence B corresponds to L-TX in the sequence A, and L-RX-ACK in the sequence B corresponds to L-RX in the sequence A.

As further illustrated in Table 1, in the feedback message C, station 1 sets L-TX-ACK=1 and L-RX-ACK=1 to indicate that the corresponding beam refinement training requests from station 2 have been accepted. The beamforming training control IE in this example continues to specify L-TX=$N_1$ and L-RX=$N_2$ to indicate to station 2 that station 1 wishes to further refine the transmit steering vector by transmitting $N_1$ training data units, and further refine the receive steering vector by receiving $N_2$ training data units from station 2 in another beam refinement session (after receiving the sequence H but prior to transmitting the message I). In general, station 1 need not request the same number of training units in further beam refinement sessions, and accordingly can specify L-TX=$N'_1$ and L-RX=$N'_2$. To indicate that no additional beam refinement sessions are desired, station 1 sets L-TX-ACK=0 and L-RX-ACK=0. Generally speaking, station 1 at this point can cancel one or both beam refinement requests, transmitted previously in the sequence A, by setting L-TX and/or L-RX to zero. It will be appreciated that the beamforming training control IE thereby provides additional flexibility, as stations can better respond to changing network conditions or other events.

With continued reference to FIG. 3 and Table 1, station 2 sets L-TX>0 in the feedback message F to indicate that station 2 wishes to conduct another session of transmit beam refinement training (after transmitting the sequence H but prior to receiving the receiving the message I). Similarly, station 2 sets L-RX>0 in the feedback message F to indicate that station 2 wishes to conduct another session of receive beam refinement training. In another mode of operation, if the station 2 does not wish to conduct another round of transmit beam refinement training or receive beam refinement training, station 2 sets respectively L-TX or L-RX to zero.

Finally, the feedback messages I indicates that station 1 wishes to conduct no further beam refinement in either the transmit or the receive direction. Station 1 can also set L-TX-ACK=0 and L-RX-ACK=0, although station 2 at this point has no pending beam refinement requests, and does not need to check the value of L-TX-ACK or L-RX-ACK. If station 2 transmits the feedback message J, station 2 can format the beamforming training control IE in a similar manner.

To consider another scenario with reference to FIG. 3, during receive beam refinement training (sequence D), station 2 can determine that the available steering vector is already acceptable for the link between stations 1 and 2. As illustrated in Table 2 below, station 2 can format the feedback message F so as to reject the request for transmit beam refinement training, transmitted in the message C, scheduled to occur after transmission of the sequence H.

TABLE 2

| Message/Sequence | Field/Value |
| --- | --- |
| A | L-TX > 0, L-TX-ACK = 0, L-RX > 0, L-RX-ACK = 0 |
| B | L-TX > 0, L-TX-ACK = 1, L-RX > 0, L-RX-ACK = 1 |
| C | L-TX > 0, L-TX-ACK = 1, L-RX > 0, L-RX-ACK = 1 |
| F | L-TX > 0, L-TX-ACK = 0, L-RX = 0, L-RX-ACK = 1 |
| I/J | L-TX = 0, L-TX-ACK = 0, L-RX = 0, L-RX-ACK = 0 |

In this case, station 2 can transmit the message F before the complete sequence D has been received by station 2, and prior to station 1 beginning to transmit the sequence E. However, it is also possible for station 2 to transmit the message F during the transmission of the sequence E. In short, stations 1 and 2 can use the beamforming training control IE described herein to dynamically adjust previously agreed-upon parameters such as numbers of training data units in beamforming training sequences.

Figure 7:
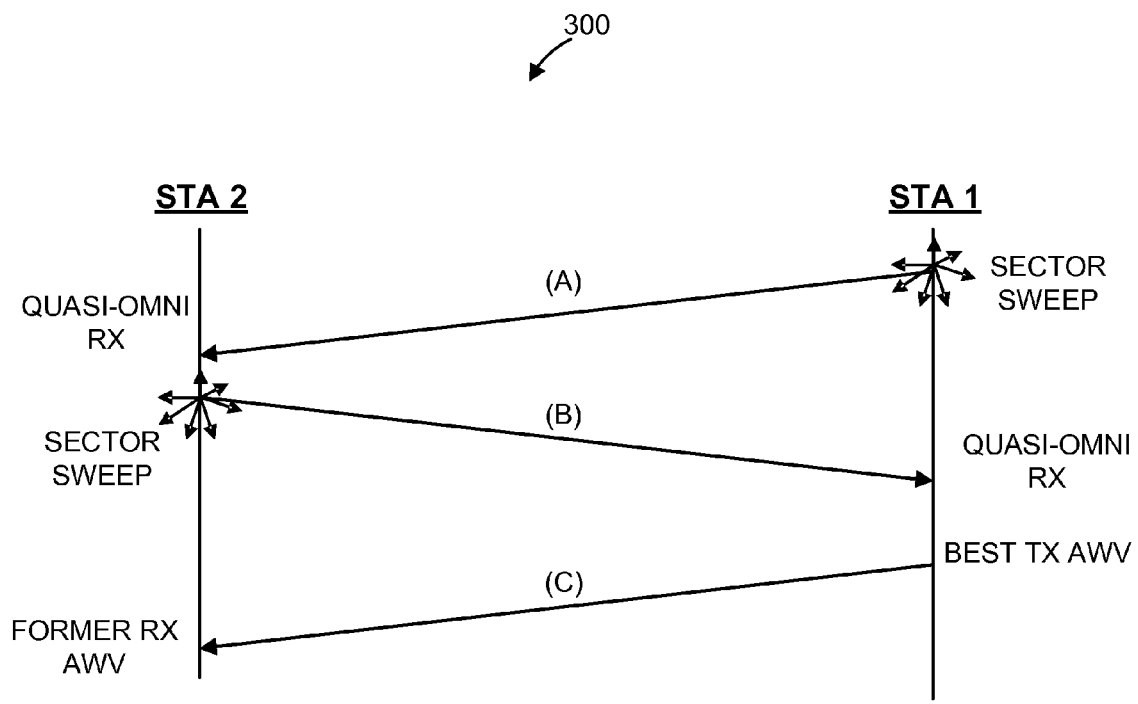
FIG. 7 is a timing diagram of an example scenario in which a station does not support beam refinement training.

Now referring to FIG. 7, an example method 300 for a joint unidirectional transmit sector sweeping that excludes beam refinement. If implemented by a pair of multi-antenna devices 32 and 34, for example, station 2 with a timeline illustrated on the left may correspond to the device 34, and station 1 with a timeline illustrated on the right may correspond to the device 32. However, it will be understood that the terms "transmitter"/"transmitting device" and "receiver"/"receiving device" merely refer to operational states of physical devices and are not intended to always limit these devices to only receiving or only transmitting in the respective communication network. For example, the device 34 in FIG. 1C can operate as a transmitter and the device 32 can operate as a receiver at some point during operation.

The method 300 corresponds to the scenario illustrated in Table 3 in which station 1 supports beam refinement but station 2 does not support beam refinement, or to the scenario illustrated in Table 4 in which station 1 does not support beam refinement.

TABLE 3

| Message/Sequence | Field/Value |
| --- | --- |
| A | L-TX > 0, L-TX-ACK = 0, L-RX > 0, L-RX-ACK = 0 |
| B | L-TX = 0, L-TX-ACK = 0, L-RX = 0, L-RX-ACK = 0 |
| C | L-TX = 0, L-TX-ACK = 0, L-RX = 0, L-RX-ACK = 0 |

TABLE 4

| Message/Sequence | Field/Value |
| --- | --- |
| A | L-TX = 0, L-TX-ACK = 0, L-RX = 0, L-RX-ACK = 0 |
| B | L-TX = 0, L-TX-ACK = 0, L-RX = 0, L-RX-ACK = 0 |
| C | L-TX = 0, L-TX-ACK = 0, L-RX = 0, L-RX-ACK = 0 |

First referring to Table 3, station 1 can request beam refinement in frames transmitted in the sequence A. However, station 2 can respond with rejections L-TX-ACK=0 and L-RX-ACK=0 for both the transmit and receive beam refinement requests. Further, station 2 does not request beam refinement training for station 2. Accordingly, station 1 updates the transmit and receive beam refinement requests by setting L-TX=0 and L-RX=0 in the final feedback message C.

If, on the other hand, station 1 does not support beam refinement, the sequence A specifies L-TX=0 and L-RX=0. Further, as discussed above, the fields L-TX-ACK and L-RX-ACK transmitted in the sequence A can indicate that a potential beam refinement request from station 2 will be rejected. Accordingly, station 2 can respond by setting each of the fields L-TX, L-TX-ACK, L-RX, and L-RX-ACK to zero.

Figure 8:
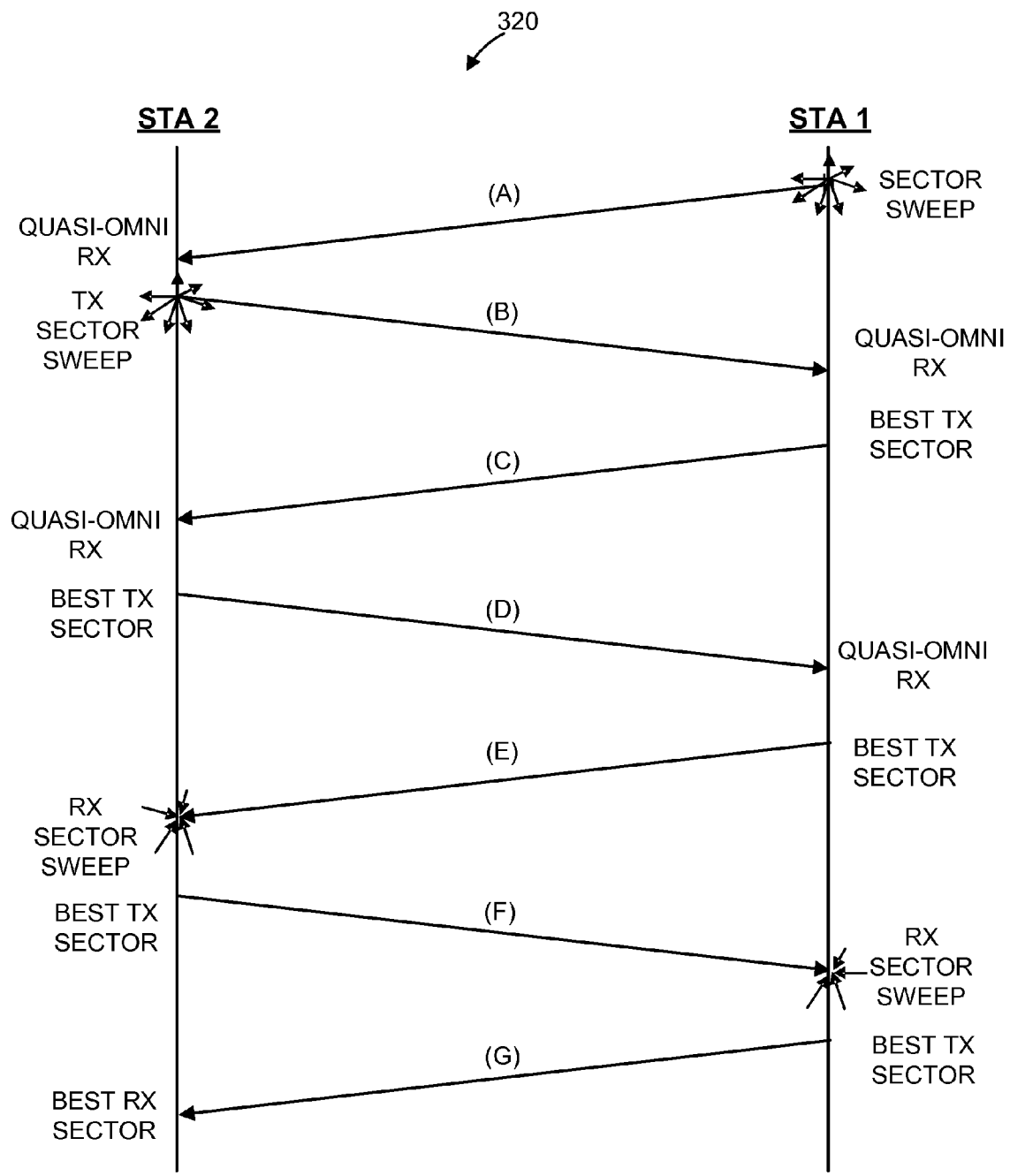
FIG. 8 is a timing diagram of an example scenario in which a station dynamically changes a beam refinement training request to a sector sweep beamforming training request.

Referring to a method 320 illustrated FIG. 8 and Table 5 below, station 1 can initially request transmit and receive beam refinement training from station 1 in frames communicated in the sequence A. Station 2 in this scenario rejects these requests in the sequence B by setting each of the fields L-TX-ACK and L-RX-ACK to zero. In response, station 1 requests another sector sweeping session in the message C. Station 2 grants the request in the message D, and station 1 proceeds to performing transmit and receive beamforming training by sector sweeping.

TABLE 5

| Message/Sequence | Field/Value |
| --- | --- |
| A | L-TX > 0, L-TX-ACK = 0/1, L-RX > 0, L-RX-ACK = 0/1<br>L-RXSW > 0, L-RXSW-ACK = 0/1 |
| B | L-TX = 0, L-TX-ACK = 0, L-RX > 0, L-RX-ACK = 0<br>L-RXSW > 0, L-RXSW-ACK = 0 |
| C | L-TX = 0, L-TX-ACK = 0, L-RX = 0, L-RX-ACK = 0<br>L-RXSW > 0, L-RXSW-ACK = 1 |
| D | L-TX = 0, L-TX-ACK = 0, L-RX = 0, L-RX-ACK = 0<br>L-RXSW > 0, L-RXSW-ACK = 1 |
| E | L-TX = 0, L-TX-ACK = 0, L-RX = 0, L-RX-ACK = 0<br>L-RXSW = 0, L-RXSW-ACK = 1 |
| F | L-TX = 0, L-TX-ACK = 0, L-RX = 0, L-RX-ACK = 0<br>L-RXSW = 0, L-RXSW-ACK = 0 |
| G | L-TX = 0, L-TX-ACK = 0, L-RX = 0, L-RX-ACK = 0<br>L-RXSW = 0, L-RXSW-ACK = 0 |

In some cases, station 1 can request both beam refinement and sector sweeping to probe for the capability of station 2. This scenario is illustrated as method 340 in FIG. 9 and Table 6 provided below.

TABLE 6

| Message/Sequence | Field/Value |
| --- | --- |
| A | L-TX > 0, L-TX-ACK = 0/1, L-RX > 0, L-RX-ACK = 0/1 L-RXSW > 0, L-RXSW-ACK = 0/1 |
| B | L-TX = 0, L-TX-ACK = 0, L-RX > 0, L-RX-ACK = 0 L-RXSW > 0, L-RXSW-ACK = 1 |
| C | L-TX = 0, L-TX-ACK = 0, L-RX = 0, L-RX-ACK = 0 L-RXSW > 0, L-RXSW-ACK = 1 |
| D | L-TX = 0, L-TX-ACK = 0, L-RX = 0, L-RX-ACK = 0 L-RXSW = 0, L-RXSW-ACK = 1 |
| E | L-TX = 0, L-TX-ACK = 0, L-RX = 0, L-RX-ACK = 0 L-RXSW = 0, L-RXSW-ACK = 0 |
| F | L-TX = 0, L-TX-ACK = 0, L-RX = 0, L-RX-ACK = 0 L-RXSW = 0, L-RXSW-ACK = 0 |

In this scenario, station 1 requests both sector sweeping and beam refinement in one or several communication frames transmitted in the sequence A. Station 2 can then choose to support either beam refinement or sector sweeping, and communicate the selection of the beamforming method in frames of the sequence B. In the example provided in Table 6, station 2 specifies L-RX-ACK=0 and L-RXSW-ACK=1 to indicate the selection of sector sweeping. Of course, it is also possible for station 2 to reject both sector sweeping and beam refinement.

Figure 10:
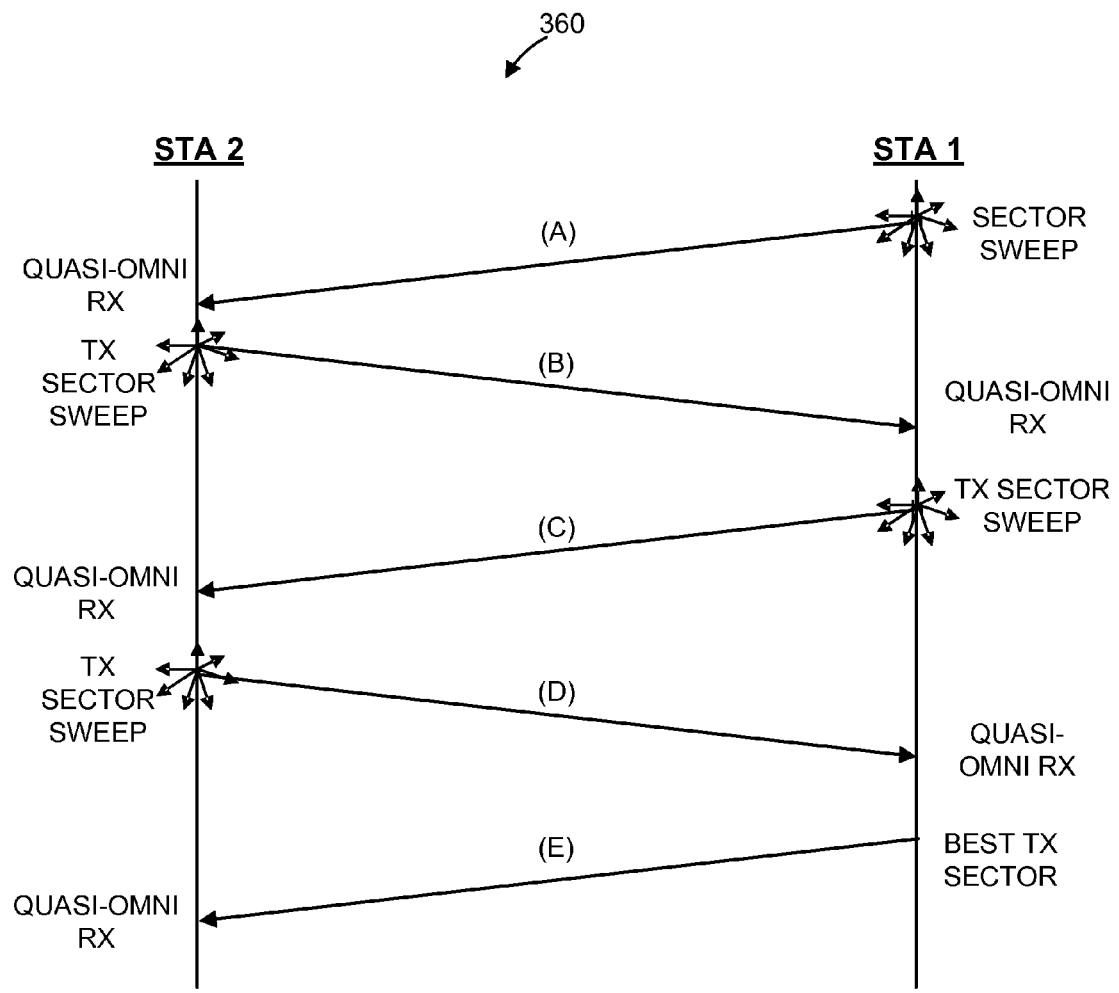
FIG. 10 is a timing diagram of an example scenario in which a station requests multiple sector sweep beamforming training sessions.

Now referring to FIG. 10, stations 1 and 2 can implement a method 360 when station 1 conducts several transmit beamforming sector sweeping sessions. The values of some of the fields in a beamforming training control IE are listed in Table 7.

TABLE 7

| Message/Sequence | Field/Value |
| --- | --- |
| A | L-TX = 0, L-TX-ACK = 0/1, L-RX = 0, L-RX-ACK = 0/1 L-TXSW > 0, L-TXSW-ACK = 0/1 |
| B | L-TX = 0, L-TX-ACK = 0, L-RX = 0, L-RX-ACK = 0 L-TXSW > 0, L-TXSW-ACK = 1 |
| C | L-TX = 0, L-TX-ACK = 0, L-RX = 0, L-RX-ACK = 0 L-TXSW = 0, L-TXSW-ACK = 1 |
| D | L-TX = 0, L-TX-ACK = 0, L-RX = 0, L-RX-ACK = 0 L-TXSW = 0, L-RXSW-ACK = 0 |
| E | L-TX = 0, L-TX-ACK = 0, L-RX = 0, L-RX-ACK = 0 L-TXSW = 0, L-TXSW-ACK = 0 |

Figure 11:
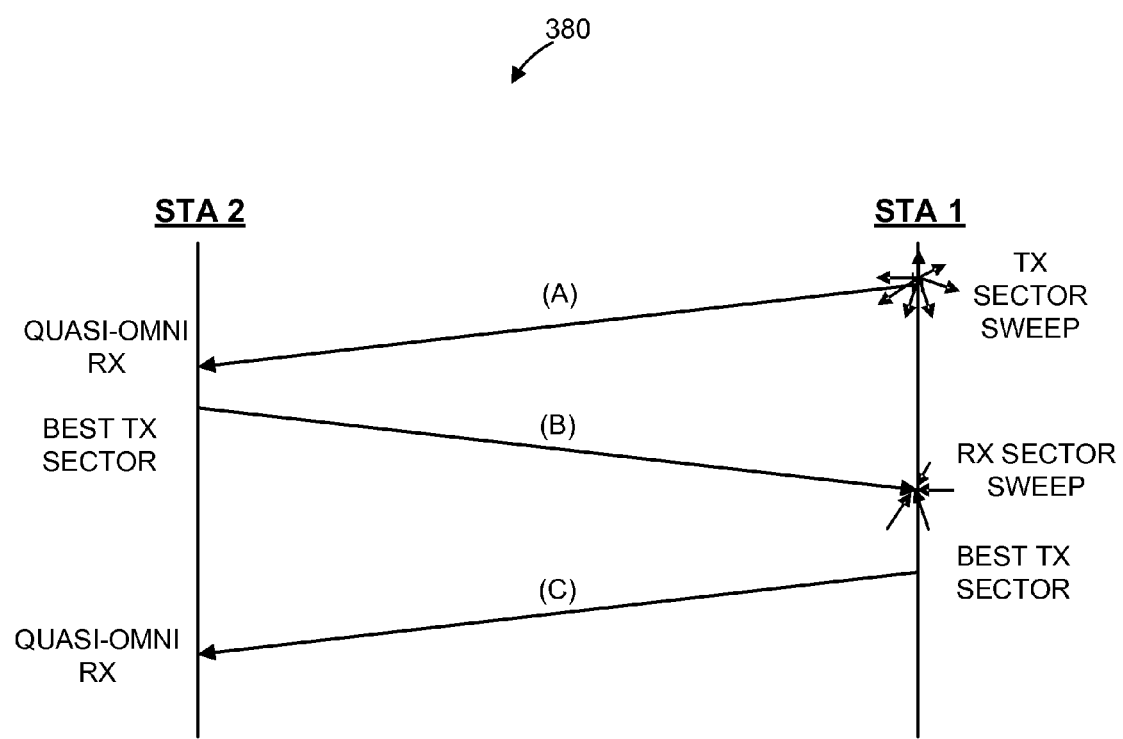
FIG. 11 is a timing diagram of an example scenario in which a station performs receive beamforming training upon completing transmit beamforming training.

Generally with respect to the beamforming training scenarios discussed above, stations 1 and 2 can also conduct some of the training procedures and transmit feedback frame in a different order to further decrease overhead associated with communicating beamforming training control information. FIG. 11 illustrates an example method 380 in which station 1 conducts transmit beamforming sector sweeping using the sequence A, followed by receive beamforming sector sweeping using the sequence B. If station 2 is a single-antenna station that does not need beamforming training, the beamforming training between stations 1 and 2 can be completed within three sequence/message exchanges A-C. It is noted that because station 2 cannot adjust the transmission gain when communicating data, station 1 adjusts the Rx steering vector to increase the gain when receiving data from station 2, and thus establish a high rate of communication between stations 1 and 2.

As illustrated in Table 8, station 1 in this scenario sets fields L-TX and L-RX in frames of the sequence A to zero to indicate that station 1 is not requesting beam refinement, and also sets L-TXSW to zero to indicate that station 1 is not requesting a further Tx sector sweep beamforming training session.

TABLE 8

| Message/Sequence | Field/Value |
| --- | --- |
| A | L-TX = 0, L-TX-ACK = 0/1, L-RX = 0, L-RX-ACK = 0/1, L-TXSW = 0, L-TXSW-ACK = 0, L-LRSW > 0, L-RXSW = 1 |
| B | L-TX = 0, L-TX-ACK = 0, L-RX = 0, L-RX-ACK = 0, L-TXSW = 0, L-TXSW-ACK = 0, L-LRSW = 0, L-RXSW = 0 |
| C | L-TX = 0, L-TX-ACK = 01, L-RX = 0, L-RX-ACK = 0, L-TXSW = 0, L-TXSW-ACK = 0, L-LRSW = 0, L-RXSW = 0 |

However, station 1 sets to L-RXSW to an integer value larger than zero to specify the number of training units to be transmitted during an Rx sector sweep beamforming training session. Station 1 further sets L-TXSW-ACK to zero to indicate that station 2 should omit Tx sector sweep beamforming of station 2, and that Rx sector sweep beamforming of station 1 should immediately follow the sequence A. In another scenario, station 1 sets L-TXSW-ACK=1 to direct station 2 to conduct Tx sector sweep beamforming, and to schedule Rx sector sweep beamforming in accordance with the regular protocol (e.g., as the sequence G in the protocol illustrated in FIG. 3). Thus, using the field L-TXSW-ACK in the frames transmitted in the sequence A, station 1 can control the order and timing of at least some of the beamforming sessions. Further, stations can similarly control the timing of beam refinement training sessions.

Figure 12:
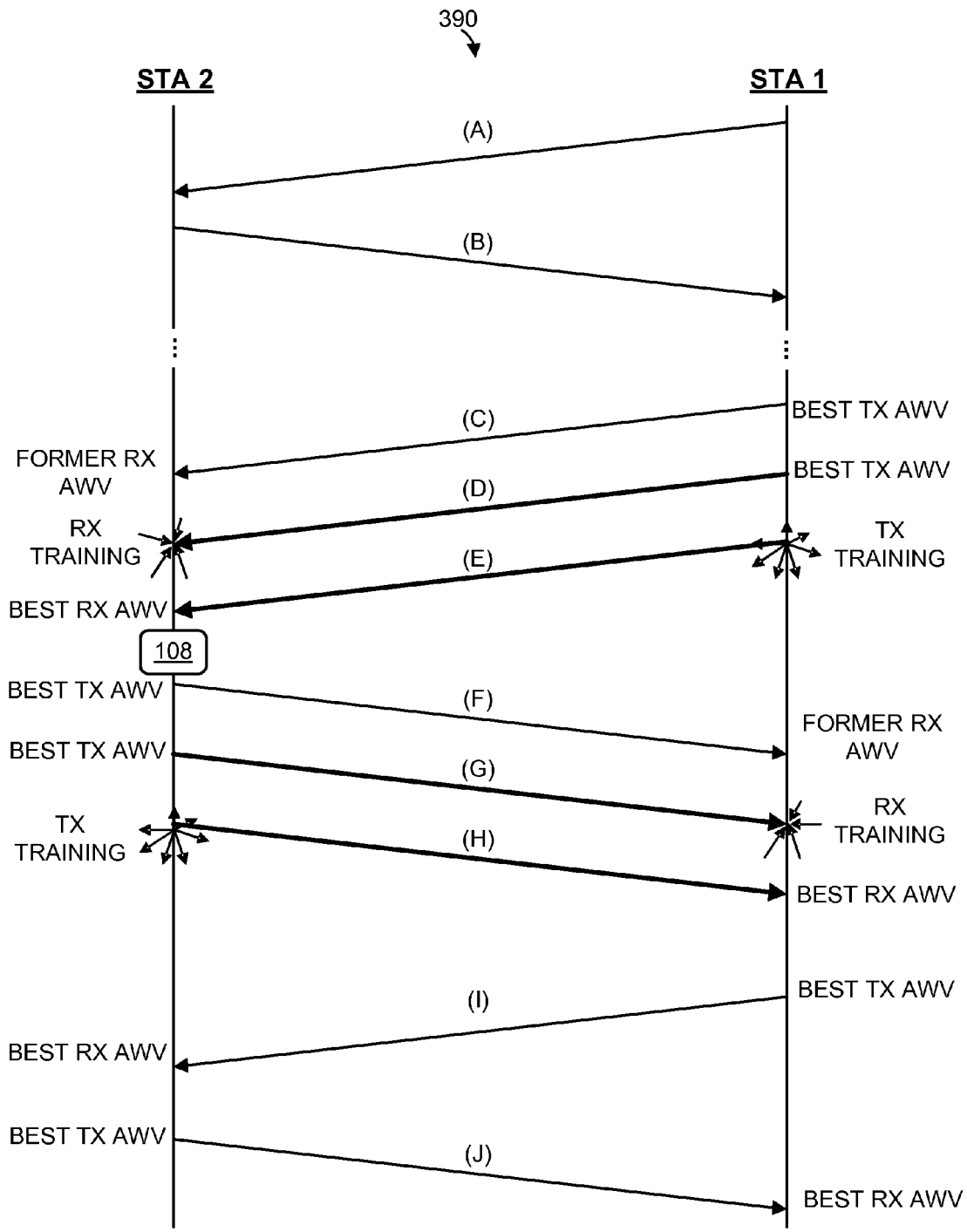
FIG. 12 is a timing diagram of an example scenario in which a station requests a beam refinement session independently of a sector sweep beamforming session.

Referring to FIG. 12, stations 1 and 2 can implement a method 390 to effectively separate sector sweeping beamforming training from beam refinement training. Thus, stations 1 and 2 can perform sector sweeping beamforming, obtain respective transmit and receive steering vectors, and exchange data at a relatively low rate. At a later time, when stations 1 and 2 require a higher data rate to support a particular application, for example, stations 1 and 2 conduct beam refinement training in accordance with the method 390.

TABLE 9

| Message/Sequence | Field/Value |
| --- | --- |
| A | L-TX > 0, L-TX-ACK = 1, L-RX > 0, L-RX-ACK = 1, L-TXSW = 0, L-TXSW-ACK = 0, L-LRSW = 0, L-RXSW = 0 |
| B | L-TX > 0, L-TX-ACK = 1, L-RX > 0, L-RX-ACK = 1, L-TXSW = 0, L-TXSW-ACK = 0, L-LRSW = 0, L-RXSW = 0 |

TABLE 9-continued

| Message/Sequence | Field/Value |
|---|---|
| C | L-TX > 0, L-TX-ACK = 1, L-RX > 0, L-RX-ACK = 1, L-TXSW = 0, L-TXSW-ACK = 0, L-LRSW = 0, L-RXSW = 0 |
| F | L-TX > 0, L-TX-ACK = 1, L-RX > 0, L-RX-ACK = 1, L-TXSW = 0, L-TXSW-ACK = 0, L-LRSW = 0, L-RXSW = 0 |

Referring to FIG. 12 and Table 9, station 1 transmits message A to station 2 in a data frame or a control frame to request a Tx beam refinement training session and an Rx beam refinement training session. In contrast to the scenario illustrated FIG. 3, for example, the message A is a request transmitted independently of a sector sweep request or session. Station 2 in this example responds with a message B to accept each of two requested training sessions and request Tx and Rx beam refinement training sessions of station 2. Upon communicating the sequence H, stations 1 and 2 can negotiate another one or several iterations of beam refinement training using messages similar to the messages A and B. In this scenario, the messages A and B can be regarded as specific BFT request and BFT response messages (or frames), respectively.

Figure 13:
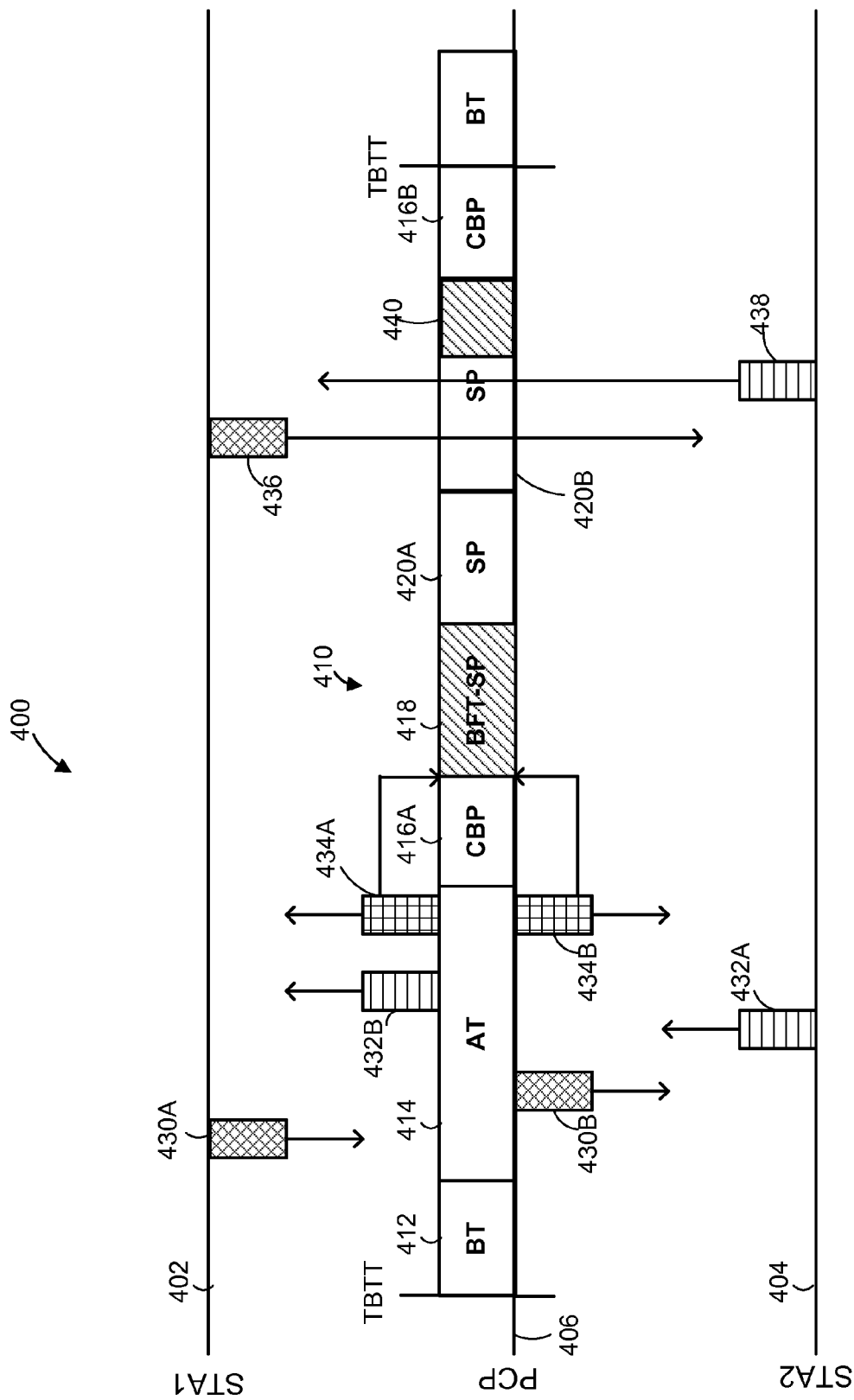
FIG. 13 is a block diagram that illustrates a superframe in which several devices exchange beamforming training information.

Next, FIG. 13 illustrates an example schedule according to which a station 402, a station 404, and a piconet central point (PCP) 406 communicate and, in particular, according to which stations 1 and 2 exchange frames related to beamforming training or a beamforming training control. A superframe 410 can include several timeslots serving different purposes. Timing of the superframe 410 can be established by the PCP 406, for example, and can be measured relative to a target beacon transmission time (TBTT). The superframe 410 includes a beacon time (BT) timeslot 412, an announcement time (AT) timeslot 414, contention-based protocol (CBP) timeslots 416A and 416B, a beamforming service period (SP) timeslot 418, and service period (SP) timeslots 420A and 420B. It will be noted that the timeslots within the superframe 410 are not drawn to scale, and that the duration of each of the timeslots 412-420B can be configurable and/or implementation-dependent. Further, although the superframe 410 is illustrated in FIG. 13 with specific types of timeslots in a specific order, one or more additional types of timeslots may be included, one or more illustrated timeslots may be omitted, and the order of timeslots may be different during a given beacon interval.

In the example of FIG. 13, to conduct beamforming training, station 1 transmits a beamforming training (BFT) request 430A that includes a BFT control IE similar or identical to the BFT control IE 200 discussed above. Because stations 1 and 2 have not yet negotiated a time period dedicated to beamforming training, station 1 transmits the BFT request 430A to the PCP 406 that, in turns, forwards this request as a BFT request 430B to station 2. As illustrated in FIG. 13, stations 1 and 2 receive and transmit BFT requests in the AT timeslot 414.

Station 2 processes the BFT request 430B and, in particular, the BFT control IE included in the BFT request 430B, determines whether the BFT request should be accepted, and transmits a BFT response 432A to the PCP 406 that includes a similar BFT control IE. In addition to indicating whether the BFT requests have been accepted, the BFT control IE specifies one or several BFT requests from station 2. The PCP 406 forwards the BFT response as a BFT response 432B to station 1.

In addition to forwarding the BFT request 430A and the BFT response 432A to the corresponding stations, the PCP 406 processes these messages and, if stations 1 and 2 agree on a BFT training session, allocates a time period within which stations 1 and 2 can conduct BFT. The PCP 406 then transmits BFT allocation frames 434A and 434B to stations 1 and 2, respectively. In this example, the BFT allocation frames 434A and 434B specify the BFT-SP timeslot 418. Accordingly, stations 1 and 2 can beamform during the BFT-SP timeslot 418.

Alternatively, station 1 can first request an SP for beamforming training between stations 1 and 2, and exchange a BFT request 436 and a corresponding BFT response 438 with station 2 directly during the SP timeslot 420B, and allocate a portion 440 of the SP timeslot 420B for BFT. The BFT session during the portion 440 can include sector sweeping, beam refinement, or both. As yet another alternative, stations 1 and 2 can dynamically negotiate BFT during the CBP timeslot 416A or the CBP timeslot 416B.

Further, in some embodiments, station 1 or 2 can transmit frames to determine beamforming capacity and compatibility of the other station. For example, station 1 can transmit a BFT capacity request frame to determine whether station 2 will be able to transmit and receive requested numbers of training data units (e.g., using the BFT control IE 200), and station 2 can transmit a BFT capacity response frame to station 1 to provide a response to the BFT capacity request frame (e.g., using the BFT control IE 200).

Figure 14A:
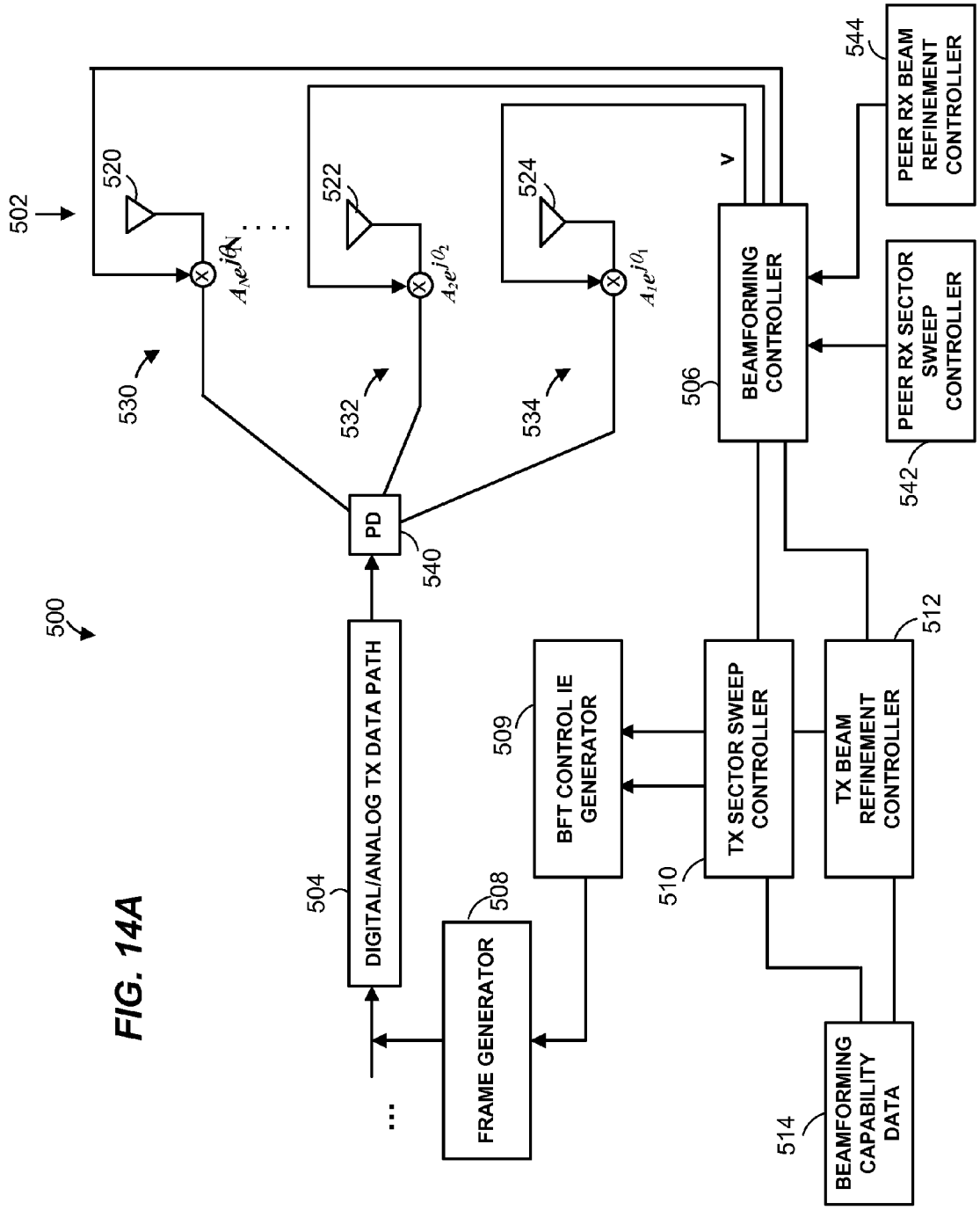
FIG. 14A is a block diagram of an example transmitter capable of transmitting communication frames that include an information element for controlling beamforming training.

FIG. 14A is a block diagram of an example transmit unit 500 that includes an antenna array 502, an analog/digital transmitter data path 504, a beamforming controller 506, a frame generator 508 to generate communication frames including BFT frames, a BFT control IE generator 509, a transmit sector sweep controller 510, a transmit beam refinement controller 512, and a memory 514 to store beamforming capability data. The antenna array 502 includes n antennas 520, 522, and 524 coupled to respective delay lines 530, 532, and 534, which may be digitally controllable and which define a beamforming network. Each of the delay lines 530, 532, and 534 can shift the signal transmitted from the corresponding antenna 520, 522, or 524 by a phase shifting angle θ. Together, the antenna array 502 and the delay lines 530, 532, and 534 define a phased array of the transmit unit 500. During a transmit beamforming procedure, the beamforming controller 506 iteratively steps through a sequence of steering vectors $u_1, u_2, \ldots u_n$ as discussed above, and applies the phase shifting angles $\theta_1, \theta_2, \ldots \theta_n$ to the digitally controllable delay lines 130, 132, and 134 according to a current value of the vector u.

The antennas 520-524 share a common analog/digital transmit data path to reduce the implementation cost of the station 500. To this end, a splitter 540 may use any suitable technique to apply one signal from the transmit data path 504 to the antennas 520-524, shifted by the corresponding angles $\theta_1, \theta_2, \ldots \theta_n$. In other embodiments, each of the antennas 520-524 and the corresponding delay line 530-534 may be coupled to a separate data path. As is generally known, the analog/digital transmit data path 504 includes some or all of such components as an encoder, an interleaver, a modulator, a digital to analog converter (DAC), an inverse Fast Fourier Transform (IFFT) processing block, etc.

In operation, the frame generator 508 generates BFT request frames, BFT response frames, beamforming training sequences, etc. Some of the frames generated by the frame generator 508 include a BFT control IE (such as the BFT control IE 200 discussed above) generated by the BFT control IE generator 509. To populate the fields L-TX, L-RX, L-TX- ACK, and L-RX-ACK, the BFT control IE generator 509 obtains the corresponding values from the transmit beam refinement controller 512. Similarly, the transmit sector sweep controller 510 supplies the values L-TXSW, L-RXSW, L-TXSW-ACK, and L-RXSW-ACK to the BFT control IE generator 509. The controllers 510 and 512 can further check the capability settings of the station 500 by analyzing information stored in the memory 514.

With continued reference to FIG. 14A, a respective one of a peer Rx sector sweep controller 542 and a peer Rx beam refinement controller 544 co-operates with the beamforming controller 506 to generate a sequence of training data units such as $d_1, d_2, \ldots d_o$ (see FIG. 2B) to conduct peer receive training during a sector sweep session or a beam refinement session. During this process, in at least some of the embodiments, the beamforming controller 506 applies the same transmit steering vector to the antenna array 502.

Generally with respect to the transmit unit 500, various ones of the modules 504, 506, 508, 510, and 512 can be implemented using hardware, software and/or firmware instructions executed by a processor, firmware, or combinations thereof. Moreover, some of the components 504, 506, 508, 510, and 512 may be implemented as custom integrated circuits, application-specific integration circuits (ASICs), etc., communicatively coupled by electrical busses, for example. Further, the delay lines 530-534 may be digitally or analog controllable.

Figure 14B:
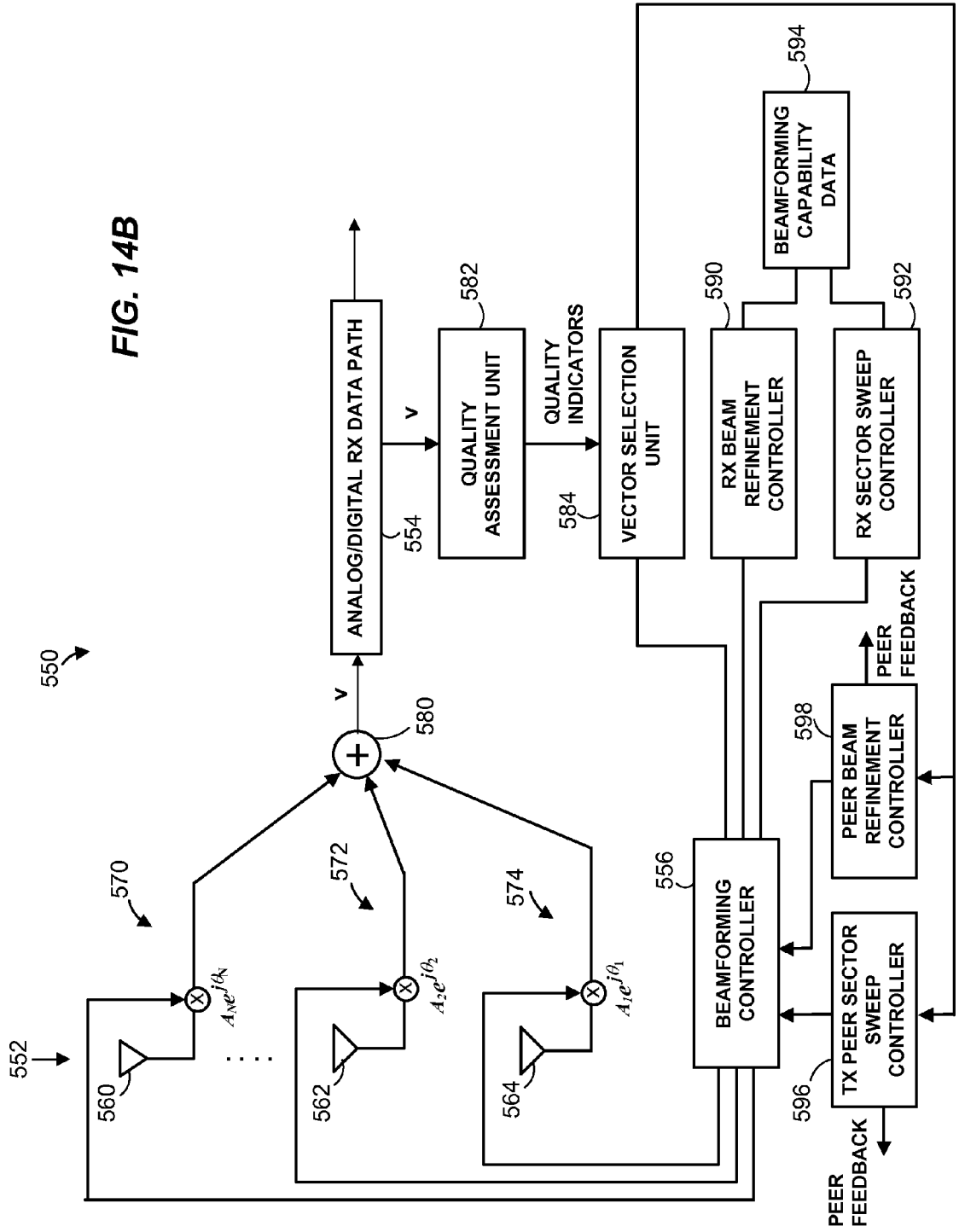
FIG. 14B is a is a block diagram of an example receiver capable of processing communication frames that include an information element for controlling beamforming training.

Now referring to FIG. 14B, an example receive unit 550 includes an antenna array 552, an analog/digital transmitter data path 554, a beamforming controller 556, antennas 560, 562, and 564, the corresponding delay lines 570, 572, and 574, and an adder 580 that combines the signals from the antennas 560-564 using any suitable technique to generate a signal vector v. A quality assessment unit 582 can generate a quality indicator or metric for the signal vector v. The quality assessment unity 582 can then supply each calculated quality indicator to the vector selection unit 584.

As discussed above, a station may sometimes choose to interrupt a beamforming training session already in progress if the quality assessment unit 582, for example, determines that the received signal level is acceptable. The vector selection unit 584 accordingly communicates with a receive beam refinement controller 590 and a receive sector sweep controller 592. Similar to the transmitter architecture illustrated in FIG. 14A, the station 550 includes a memory 594 to store beamforming training capability data.

Further, a peer Tx sector sweep controller 596 and a peer Tx beam refinement controller 598 co-operate with the beamforming controller 556 and the quality assessment unit 582 to evaluate a sequence of training data units such as $d_1, d_2, \ldots d_n$ (see FIG. 2B) received during a peer transmit training during a sector sweep session or a beam refinement session, respectively. During this process, in at least some of the embodiments, the beamforming controller 556 applies the same receive steering vector to the antenna array 552. In an embodiment, the peer Tx sector sweep controller 596 and the peer Tx beam refinement controller 598 additionally manage assessed quality of the received training data units, and generate feedback information to be transmitted to the peer device.

Figure 9:
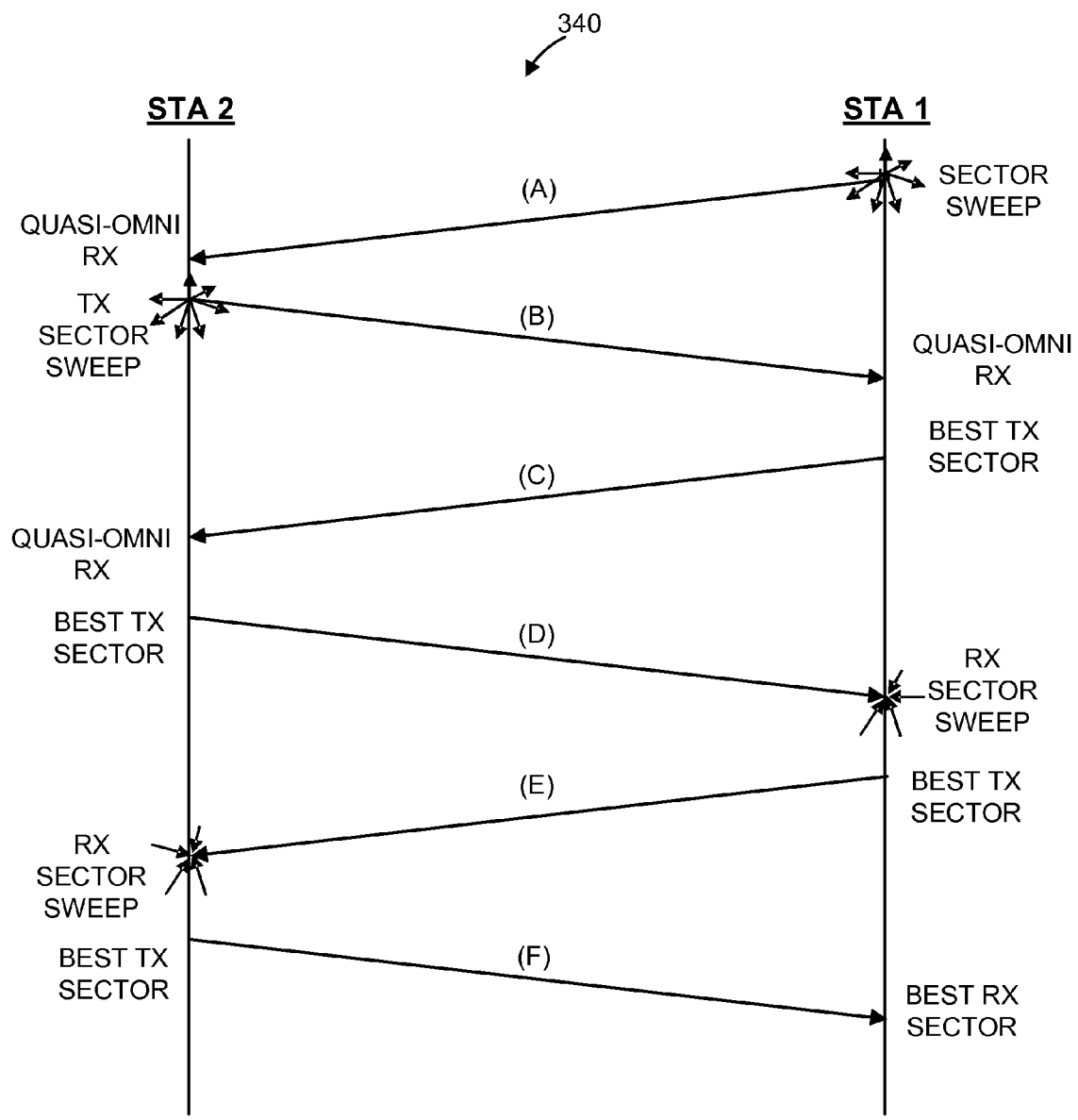
FIG. 9 is a timing diagram of an example scenario in which a station selects between a sector sweep beamforming training request and a beam refinement training request.

In general, the station 500 transmits frames to support one or more of the scenarios illustrated in FIGS. 3 and 7-12 according to a schedule such the schedule 400 illustrated in FIG. 13, and the station 550 receives and processes frames transmitted in accordance with one or more of the scenarios illustrated in FIGS. 3 and 7-12, and according to the schedule 400 illustrated in FIG. 13 or a similar schedule. For example, referring to FIGS. 14A and 14B as well as back to FIG. 3, the transmit sector sweep controller 510 in cooperation with the beamforming controller 506 can control the timing, sequencing, and formatting of data units transmitted in the sequence A; the transmit beam refinement controller 512 in cooperation with the beamforming controller 506 and the BFT control IE generator 509 can control the timing and sequencing, and formatting of data units transmitted in the sequence E; and the receive beam refinement controller 590 in cooperation with the beamforming controller 556 and the quality assessment unit 582 can evaluate the data units communicated in the sequence D or the sequence G. Referring also to FIG. 9, the receive sector sweep controller 592 in cooperation with the beamforming controller 556 and the quality assessment unit 582 can evaluate the data units communicated in the sequence D. The beamforming controller 556 can also cooperate with the quality assessment unit 582 and the vector selection unit 584 to generate feedback messages such the messages C, F, I, or J (see FIG. 3).

Figure 15:
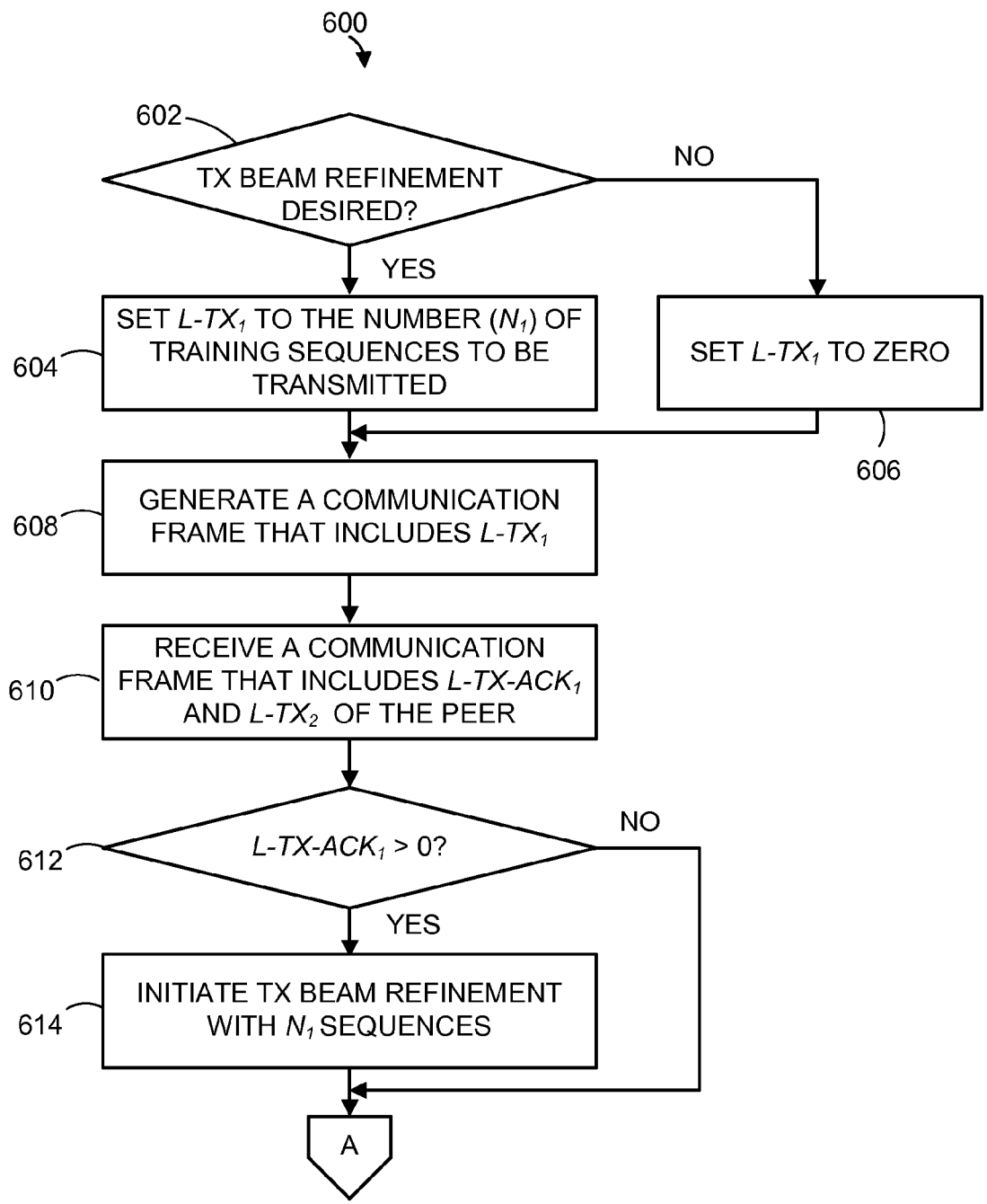
FIG. 15 is a flow diagram of an example method for generating a data unit that includes beamforming training control information.

Thus, the controllers 510, 512, 590, and 592, alone or in cooperation with other components of the respective stations 500 and 550, cause training data units to be communicated during the appropriate time periods. In some cases, the receive beam refinement controller 590 and the beamforming controller 556 configure the antenna array 552 to receive several training data units in an omni mode (e.g., during a transmit beamforming session of a peer station). In other cases, the receive beam refinement controller 590 and the beamforming controller 556 configure the antenna array 552 to receive several training data units using a different steering vector for each data unit (e.g., during a receive beamforming session of the station 550). The transmit beam refinement controller 510 and the beamforming controller 506 similarly configure the antenna array 502 to transmit several training data units in an omni mode (e.g., during a receive beamforming session of a peer station) or using a different steering vector for each data unit (e.g., during a transmit beamforming session of the station 500).s FIG. 15 is a flow diagram of an example method 600 for generating a frame having a BFT control IE, and processing a frame that also includes a BFT control IE and is responsive to the generated frame. At block 602, a station determines whether transmit beam refinement is desired. To this end, the transmit beam refinement controller 512 can access the beamforming capability data 514, for example. Generally speaking, a station can choose to skip beam refinement training for reasons other than lack of beamforming training capability (e.g., requirements of the particular application, power management, etc.).

If beam refinement is desired and the station is capable of supporting beam refinement, the station sets the field $L-TX_1$ to the number $N_1$ of training data units to be transmitted to a peer station (block 604). As one example, the BFT control IE generator 509 (see FIG. 14A) can populate this and other fields of the BFT control IE and supply the formatted IE to the frame generator 508. Otherwise, if it is determined at block 602 that transmit beam refinement is not desired, the BFT control IE generator 509 sets $L-TX_1$ to zero in block 606. At block 608, the station generates a frame that includes the BFT control IE with the field $L-TX_1$ populated at block 604 or 606. In another embodiment, the station includes the BFT control IE in a frame generated for another primary purpose, e.g., a beamforming training frame. As discussed above, it is possible to transmit a BFT control IE in BFT request frames, BFT response frames, BFT feedback frames, etc.

The station then transmits the frame and receives a frame from the peer station (directly or via a PCP) at block 610. The received frame includes a BFT control IE that includes the field L-TX-ACK$_1$ that corresponds to the field L-TX$_1$. Further, the BFT control IE can include field L-TX$_2$ that specifies a number N$_2$ of data units that the peer station wishes to transmit during the transmit beam refinement training of the peer station. At block 612, the station checks whether the peer station has accepted or rejected the transmit beam refinement request by comparing L-TX-ACK$_1$ to zero. If the peer station has accepted the transmit beam refinement request, the station initiates a beam refinement session that will include N$_1$ data units (block 614). Thus, the frame received from the peer station at block 608 includes BFT control information related to both the station and the peer station.

Figure 16:
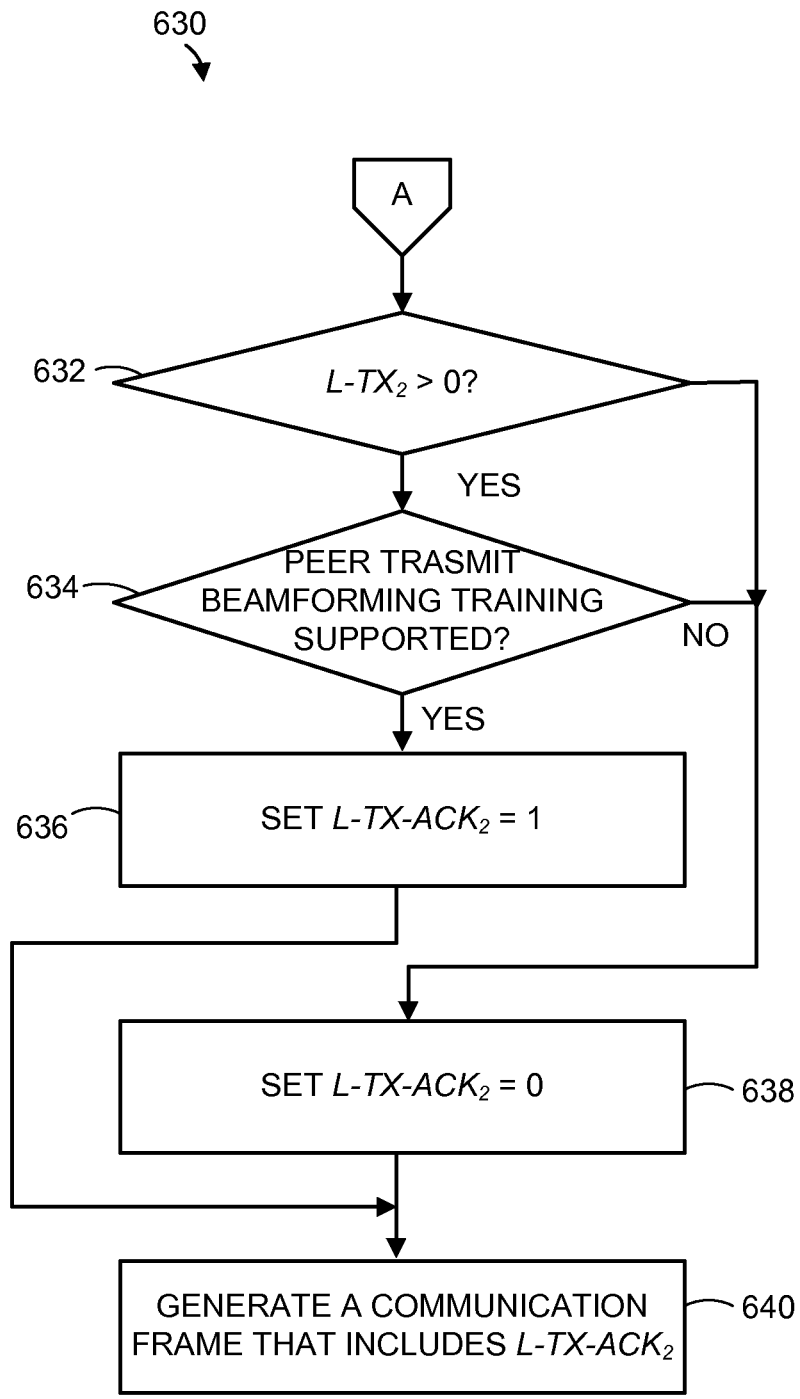
FIG. 16 is a flow diagram of an example method for processing a data unit that includes beamforming training control information.

Upon generating a transmit beam refinement request and processing a corresponding response, the station can process the transmit beam refinement request of the peer station. FIG. 16 is a flow diagram of an example method 630 for processing transmit beam refinement requests. At block 632, the station (e.g., the receive beam refinement controller 590) checks whether the peer station requested transmit beam refinement training by comparing L-TX$_2$ to zero. If the station identifies a request for beam refinement training, the station checks the beamforming capability of the station at block 634. Referring back to FIG. 14B, for example, the receive beam refinement controller 590 at this point can check the memory location 594. If the station can and is willing to support transmit beam refinement training of the peer station, the receive beam refinement controller 590 sets the field L-TX-ACK$_2$ to one in a BFT control IE at block 636. Otherwise, the receive beam refinement controller 590 sets the field L-TX-ACK$_2$ to zero at block 638. Finally, at block 640, the station can generate a frame including a BFT control IE in which the field field L-TX-ACK$_2$ is populated as discussed above. In another embodiment, the station includes the BFT control IE in a frame generated for another primary purpose, e.g., a beamforming training frame. As one example, the BFT control IE generator 509 can format the BFT control IE and supplies the formatted IE to the frame generator 508.

It will be noted that the methods 600 and 630 can be implemented as a single method or as separate methods. Further, each of the methods 600 and 630 can similarly apply to sector sweep requests. For example, a station in one embodiment determines at a step similar to block 602 whether transmit sector sweep beamforming training is desired, and accordingly proceeds to generate frames, initiate the training session, etc.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored on any computer readable medium such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this disclosure, which would still fall within the scope of the claims.

What is claimed is:

1. A method comprising:
   generating, at a first device, training data for a first training session between the first device and a second device, the training data including a first data unit to be transmitted during the first training session, wherein generating the first data unit includes generating a field of the first data unit that specifies a first number of beamforming training data units that can be communicated during a second training session to occur after the first training session, wherein the field of the first data unit that specifies the first number of beamforming training data units corresponds to a request for the second device to participate in the second training session;
   causing the training data including the first data unit to be transmitted from the first device to the second device during the first training session;
   processing, at the first device, a second data unit received by the first device, wherein the second data unit includes a response, by the second device, to the request, in the first data unit, for the second device to participate in the second training session, wherein processing the second data unit includes determining whether the request for the second device to participate in the second training session was accepted by the second device based on a first field of the second data unit, wherein the first field of the second data unit is a single bit, wherein a first value of the first field indicates that the request for the second training session is accepted by the second device, and wherein a second value of the first field indicates that the request for the second training session is rejected by the second device; and
   in response to determining that the request to participate in the second training session was accepted by the second device, causing the first number of beamforming training data units to be transmitted by the first device during the second training session.

2. The method of claim 1, wherein causing the first number of beamforming training data units to be transmitted during the second training session includes:

configuring an antenna array to transmit the first number of beamforming training data units; and applying a different steering vector to the antenna array as each of the specified first number of beamforming training data units is transmitted.

3. The method of claim 1, wherein each of the first training session and the second training session is associated with receive beamforming training or transmit beamforming training.

4. The method of claim 1, wherein each of the first training session and the second training session is associated with beam refinement or sector sweeping.

5. The method of claim 1, wherein the second data unit is one of:
- a sector sweep beamforming training data unit;
- a sector sweep feedback data unit;
- a beam refinement training data unit; or
- a beam refinement feedback data unit.

6. The method of claim 1, wherein the first data unit is a beamforming capacity request data unit or a beamforming request data unit; and wherein the second data unit is a beamforming capacity response data unit or a beamforming response data unit.

7. The method of claim 1, wherein:
generating the first data unit further includes generating a second field that specifies a second number of beamforming training data units that can be communicated during a third training session to occur after the second training session, wherein the first training session is associated with transmit beamforming training, and wherein the third training session is associated with receive beamforming training;
processing the second data unit further includes determining whether the third training session was accepted by the second device based on a second field of the second data unit; and
the method further comprises, if the third training session was accepted:
configuring an antenna array to receive the second number of beamforming training data units, and
applying a different steering vector to the antenna array as each of the specified second number of beamforming training data units is received.

8. The method of claim 7, wherein:
generating the first data unit further includes generating a third field, wherein a first value of the third field specifies that the third training session is to be conducted immediately following the first training session, and a second value of the third field specifies that a fourth training session is to be conducted following the second training session.

9. The method of claim 1, wherein generating the first data unit further includes:
generating a second field that indicates whether a beamforming training request previously received from the second station is rejected.

10. The method of claim 1, wherein:
the first training session is a first sector sweep beamforming training session; and
the method further comprises generating a third data unit to be transmitted after transmission of the first data unit, including generating a field that specifies a second number of beamforming training data units to be transmitted by the second device during a second sector sweep beamforming training session, wherein the field that specifies the second number of beamforming training data units corresponds to a request for the second device to participate in the second sector sweep beamforming training session.

11. An apparatus comprising:
a transceiver device including one or more integrated circuit devices configured to:
generate a beamforming training (BFT) control information element (IE) to be transmitted during a first beamforming training session, wherein the transceiver device is configured to generate a first field of the BFT control IE that specifies a first number of training data units to be communicated to a communication device during a second beamforming training session to occur after the first beamforming training session, wherein the first field corresponds to a request for the communication device to participate in the second beamforming training session, and wherein the second beamforming training session corresponds to transmit beamforming training;
generate a first data unit to be transmitted during the first beamforming training session, wherein the first data unit includes the BFT control IE and training data for the first beamforming training session;
process a second data unit received from the communication device, wherein the second data unit includes a response, by the communication device, to the request, in the first data unit, for the communication device to participate in the second training session, wherein processing the second data unit includes determining whether the request for the communication device to participate in the second training session was accepted by the communication device based on a first field of the second data unit, wherein the first field of the second data unit is a single bit, wherein a first value of the first field indicates that the request for the second training session is accepted by the communication device, and wherein a second value of the first field indicates that the request for the second training session is rejected by the communication device; and
in response to determining that the request to participate in the second training session was accepted by the communication device, cause the first number of beamforming training data units to be transmitted during the second training session.

12. The apparatus of claim 11, wherein the one or more integrated circuit devices are further configured to:
configure an antenna array to transmit the first number of beamforming training data units; and
apply a different steering vector to the antenna array as each of the specified first number of beamforming training data units is transmitted.

13. The apparatus of claim 11, wherein each of the first training session and the second training session is associated with receive beamforming training or transmit beamforming training.

14. The apparatus of claim 11, wherein each of the first training session and the second training session is associated with beam refinement or sector sweeping.

15. The apparatus of claim 11, wherein the second data unit is one of:
- a sector sweep beamforming training data unit;
- a sector sweep feedback data unit;
- a beam refinement training data unit; or
- a beam refinement feedback data unit.

16. The apparatus of claim 11, wherein the first data unit is a beamforming capacity request data unit or a beamforming request data unit, and wherein the second data unit is a beamforming capacity response data unit or a beamforming response data unit.

17. The apparatus of claim 11, wherein the one or more integrated circuit devices are further configured to:
generate a second field of the first data unit, wherein the second field of the first data unit specifies a second number of beamforming training data units that can be communicated during a third training session to occur after the second training session, wherein the first training session is associated with transmit beamforming training, and wherein the third training session is associated with receive beamforming training;
determine whether the third training session was accepted by the communication device based on a second field of the second data unit; and
if the third training session was accepted:
configure an antenna array to receive the second number of beamforming training data units, and
apply a different steering vector to the antenna array as each of the specified second number of beamforming training data units is received.

18. The apparatus of claim 17, wherein the one or more integrated circuit devices are further configured to generate a third field of the first data unit, wherein a first value of the third field specifies that the third training session is to be conducted immediately following the first training session, and a second value of the third field specifies that a fourth training session is to be conducted following the second training session.

19. The apparatus of claim 11, wherein the one or more integrated circuit devices are further configured to generate a second field of the first data unit, wherein the second field indicates whether a beamforming training request previously received from the communication device is rejected.

20. The apparatus of claim 11, wherein the first training session is a first sector sweep beamforming training session; and
the one or more integrated circuit devices are further configured to generate a third data unit to be transmitted after transmission of the first data unit, including generating a field that specifies a second number of beamforming training data units to be transmitted by the communication device during a second sector sweep beamforming training session, wherein the field that specifies the second number of beamforming training data units corresponds to a request for the communication device to participate in the second sector sweep beamforming training session.

* * * * *